United States Patent
Yamamoto et al.

(10) Patent No.: US 8,557,448 B2
(45) Date of Patent: Oct. 15, 2013

(54) FUEL CELL AND FUEL CELL SEPARATOR

(75) Inventors: Yoshinori Yamamoto, Toyota (JP); Yuichi Yagami, Susono (JP); Jiro Aizaki, Toyota (JP); Junichi Shirahama, Toyota (JP); Sogo Goto, Suntou-gun (JP); Tsuyoshi Takahashi, Nishikamo-gun (JP); Tomokazu Hayashi, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 758 days.

(21) Appl. No.: 11/667,876

(22) PCT Filed: Jan. 12, 2006

(86) PCT No.: PCT/JP2006/300679
§ 371 (c)(1),
(2), (4) Date: May 16, 2007

(87) PCT Pub. No.: WO2006/075786
PCT Pub. Date: Jul. 20, 2006

(65) Prior Publication Data
US 2007/0298308 A1    Dec. 27, 2007

(30) Foreign Application Priority Data
Jan. 13, 2005 (JP) .................... 2005-6290

(51) Int. Cl.
H01M 8/00  (2006.01)
H01M 8/04  (2006.01)
H01M 8/06  (2006.01)
H01M 2/40  (2006.01)

(52) U.S. Cl.
USPC ............ 429/400; 429/514; 429/437; 429/457

(58) Field of Classification Search
USPC .......................................... 429/129, 246, 247
See application file for complete search history.

(56) References Cited

U.S. PATENT DOCUMENTS 5,998,055 A    12/1999   Kurita et al.
2002/0071981 A1*  6/2002   Sano et al. ..................... 429/30

(Continued)

FOREIGN PATENT DOCUMENTS

DE           102 53 002 A1    6/2004
DE    10 2004 021 253 A1   11/2004

(Continued)

OTHER PUBLICATIONS

International Preliminary Report on Patentability, Appln. No. PCT/JP2006/300679 dated Jul. 26, 2007.

*Primary Examiner* — Bijay Saha
(74) *Attorney, Agent, or Firm* — Kenyon & Kenyon LLP

(57) ABSTRACT

The fuel cell of the invention includes an electrolyte assembly, and a separator having one face as a gas flow path-forming face with a gas flow path formed thereon to allow flow of a reactive gas and the other face, which is reverse to the one face, as a refrigerant flow path-forming face with a refrigerant flow path formed thereon to allow flow of a refrigerant. The gas flow path-forming face of the separator has multiple linear gas flow paths that are arranged in parallel to one another, and a gas flow path connection structure that divides the multiple linear gas flow paths into plural linear gas flow path groups and connects at least part of the plural linear gas flow path groups in series. The refrigerant flow path-forming face has multiple linear refrigerant flow paths that are formed as a reverse structure of the multiple linear gas flow paths on the gas flow path-forming face, and a refrigerant flow path connection structure that is formed as a reverse structure of the gas flow path connection structure on the gas flow path-forming face to connect the multiple linear refrigerant flow paths in parallel.

12 Claims, 17 Drawing Sheets

(56) References Cited

U.S. PATENT DOCUMENTS

| | | | |
|---|---|---|---|
| 2003/0213690 A1* | 11/2003 | Smedley et al. | 204/247.2 |
| 2003/0215692 A1 | 11/2003 | Rock et al. | |
| 2004/0038112 A1* | 2/2004 | Mohri et al. | 429/38 |
| 2004/0115512 A1 | 6/2004 | Fujii et al. | |

FOREIGN PATENT DOCUMENTS

| | | | |
|---|---|---|---|
| EP | 1 047 143 A2 | 10/2000 | |
| EP | 1 557 893 A1 | 7/2005 | |
| JP | 10-106594 A | 4/1998 | |
| JP | 11-354134 A | 12/1999 | |
| JP | 2000-231929 A | 8/2000 | |
| JP | 2000-311696 A | 11/2000 | |
| JP | 2001-143725 A | 5/2001 | |
| JP | 2001-148252 A | 5/2001 | |
| JP | 2001 148252 A1 * | 5/2001 | |
| JP | 2001-196079 A | 7/2001 | |
| JP | 2001-345109 A | 12/2001 | |
| JP | 2002-184428 A | 6/2002 | |
| JP | 2003-142126 A | 5/2003 | |
| JP | 2004-171824 A | 6/2004 | |
| JP | 2004-319279 A | 11/2004 | |
| JP | 2004-327089 A | 11/2004 | |
| JP | 2005-108505 A | 4/2005 | |

* cited by examiner

First Embodiment

Fig.5
Second Embodiment
(a) Cross Section XX
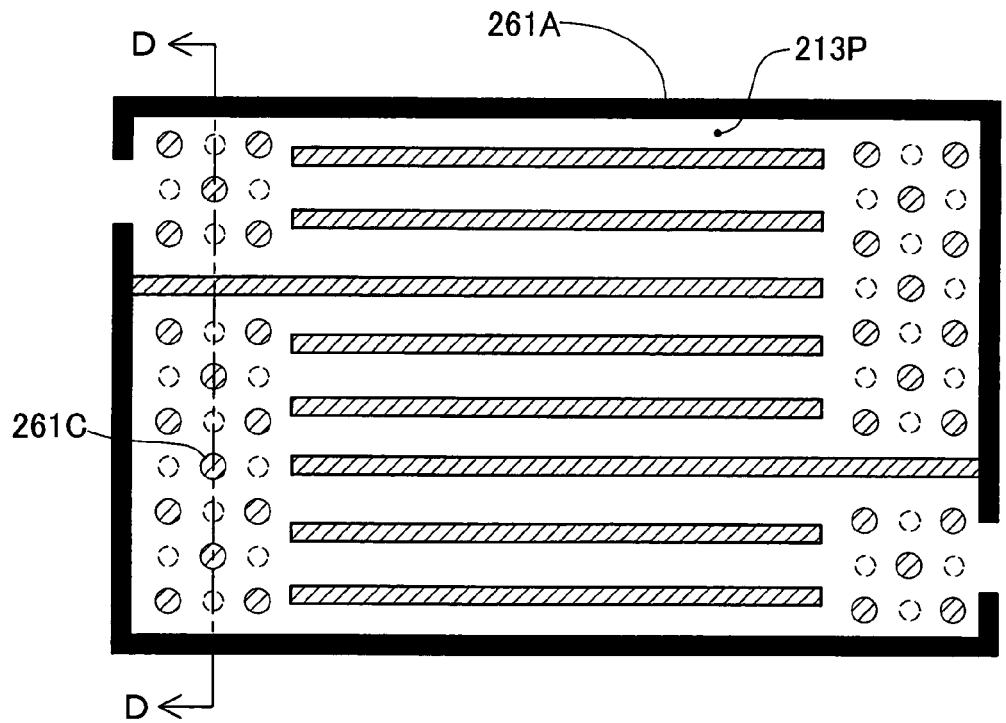
(b) Cross Section DD
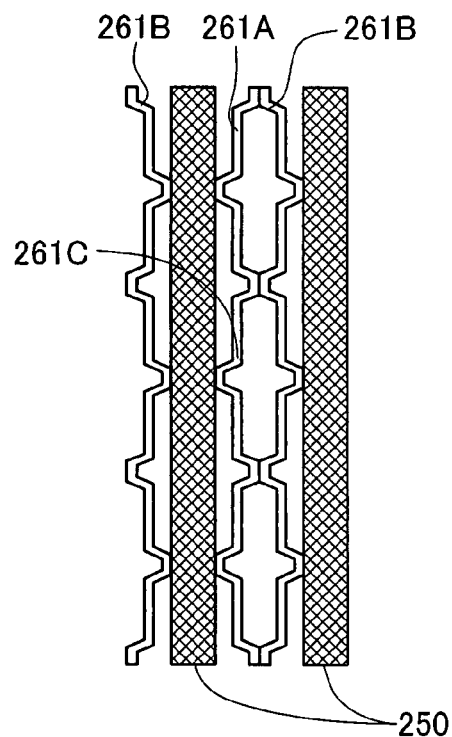

Fig.6
Third Embodiment
(a) Cross Section XX
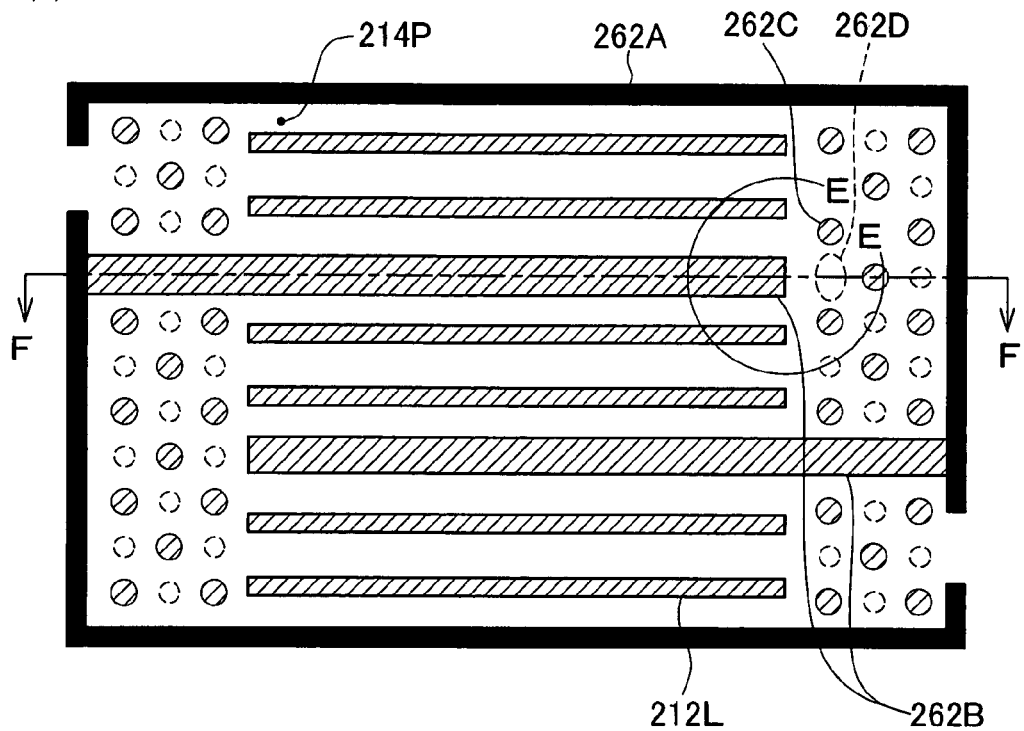
(b) Refrigerant Flow Path-forming face in Area EE
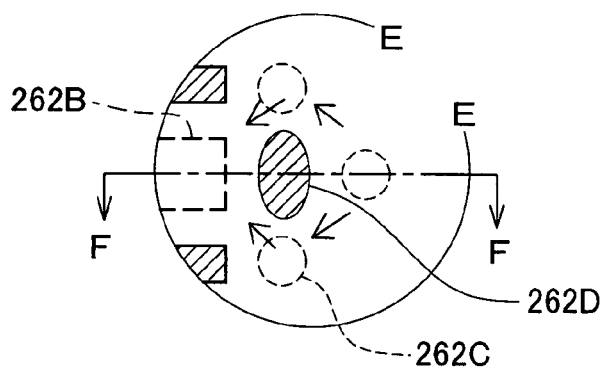
(c) Cross Section FF
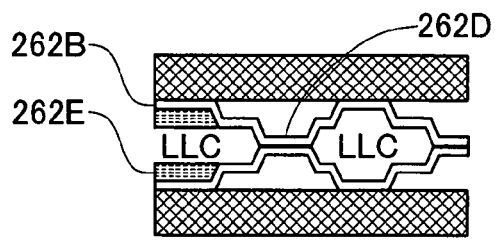

Fourth Embodiment

Fig.10
(A) Gas Flow Path-Forming Face
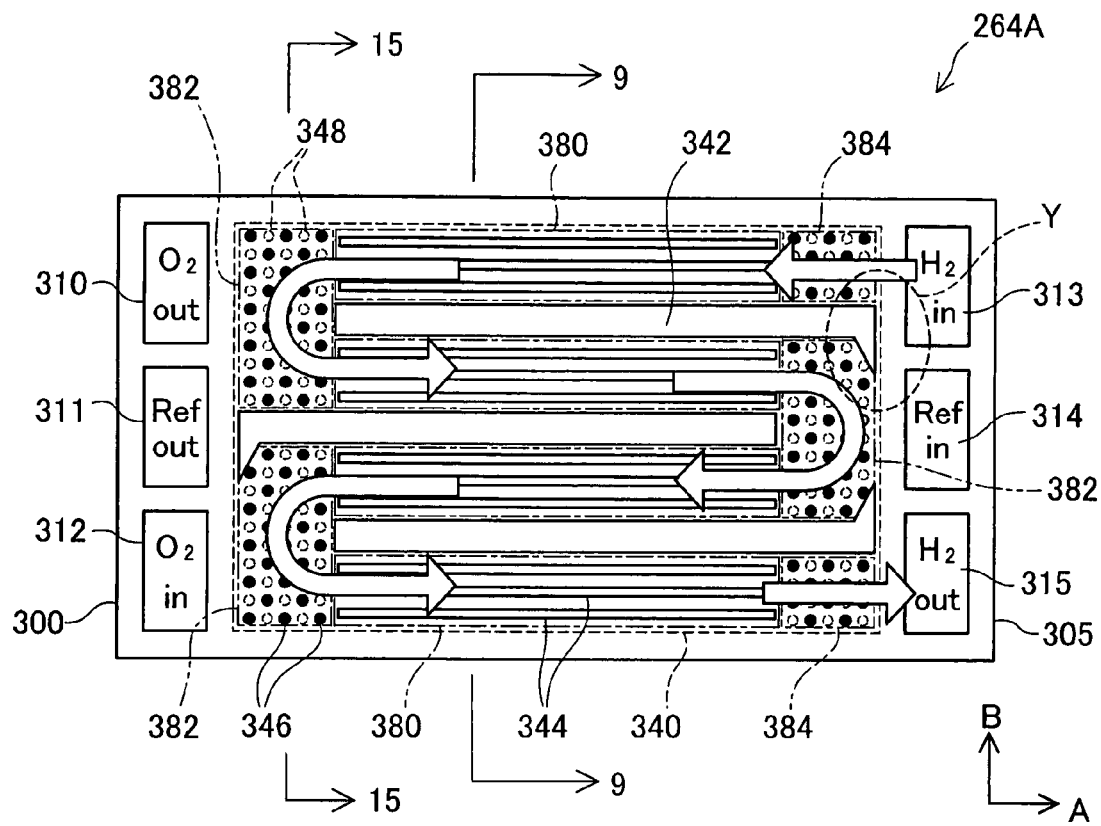
(B) Refrigerant Flow Path-Forming Face
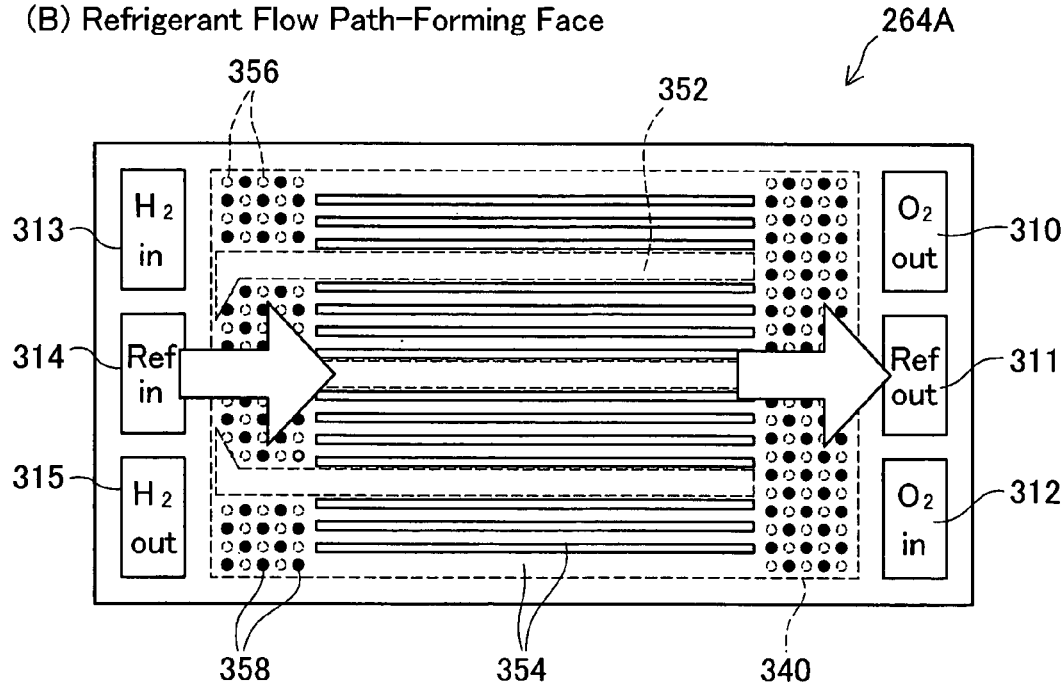

Fig.11
(A) Gas Flow Path-Forming Face
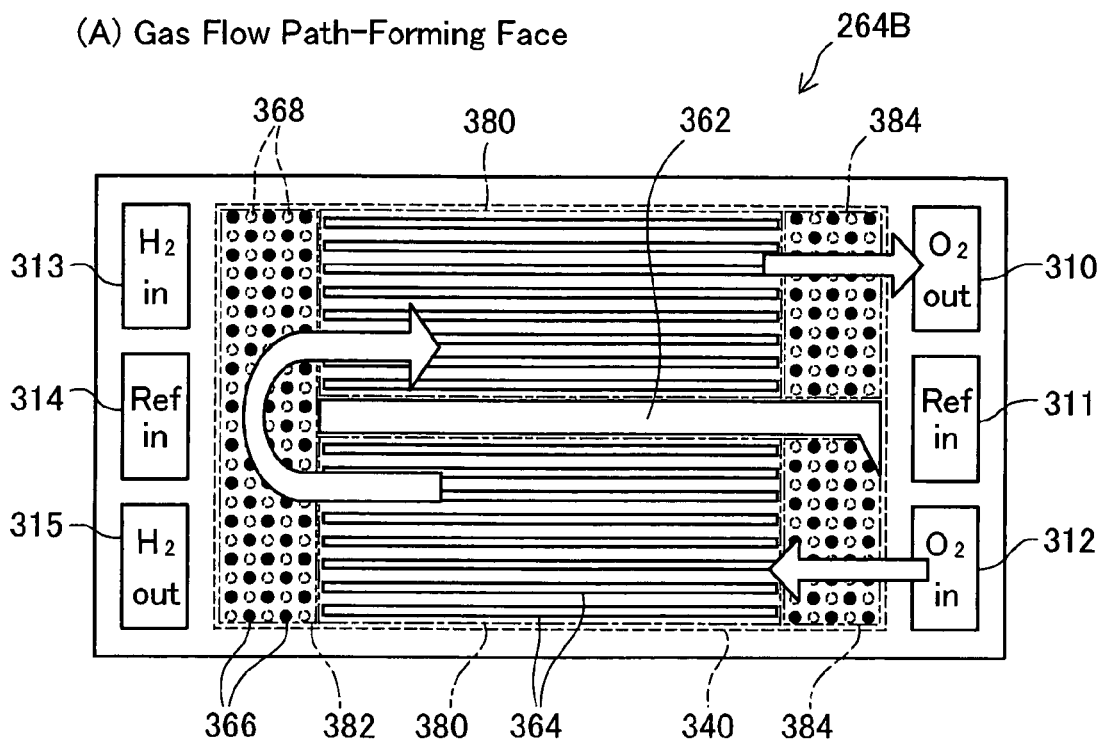
(B) Refrigerant Flow Path-Forming Face
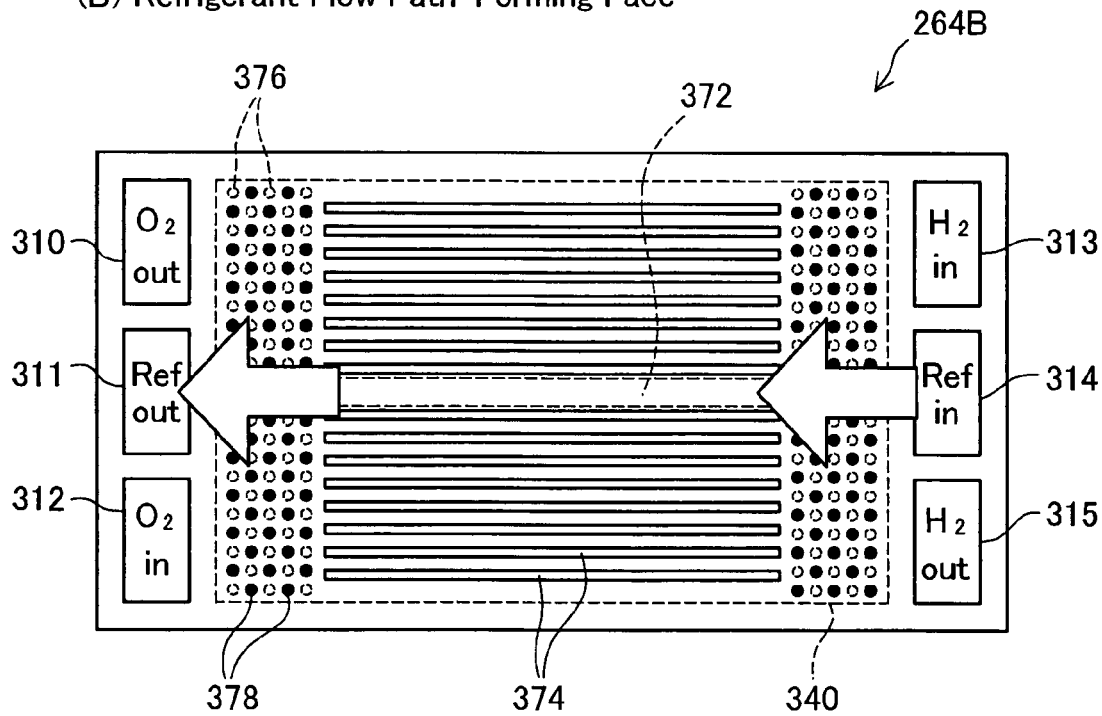

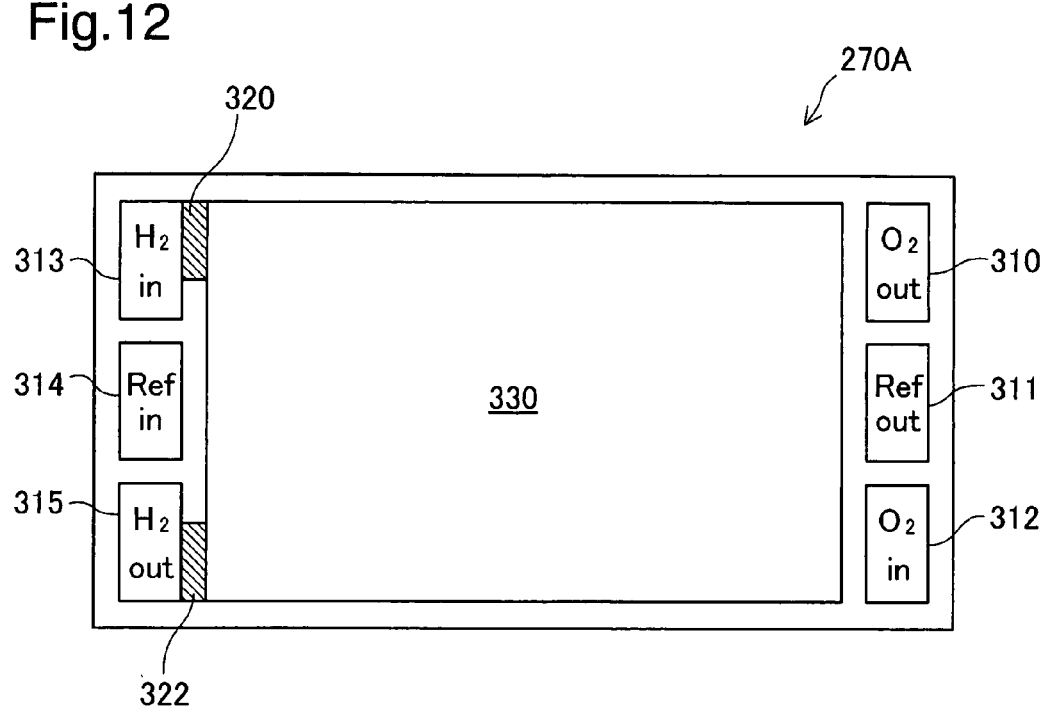
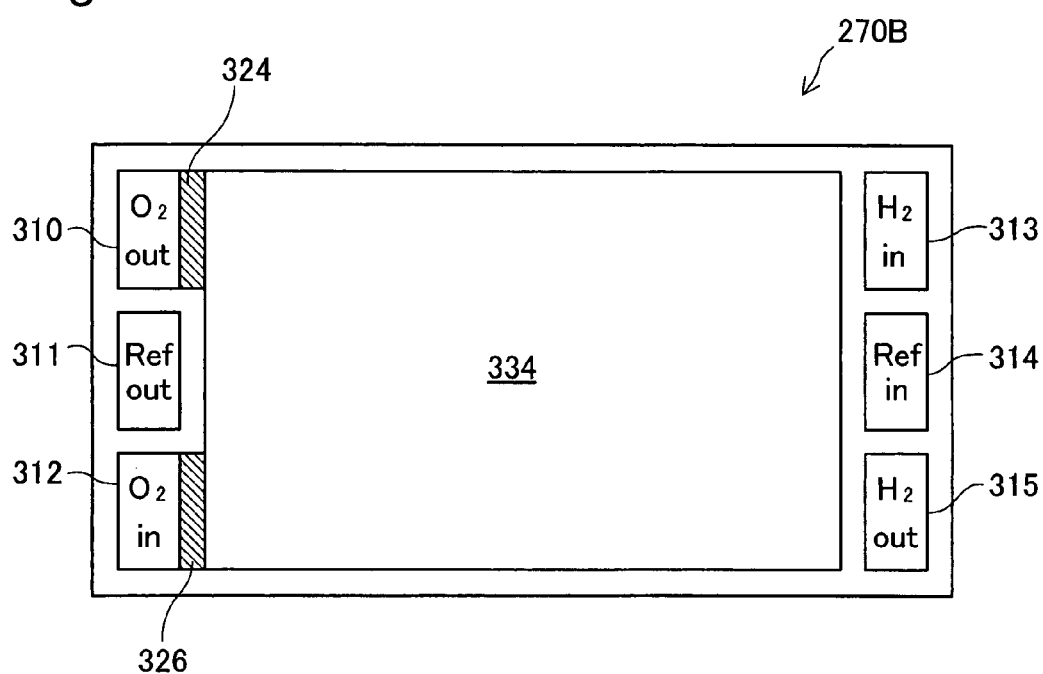

Fig.17
(A)
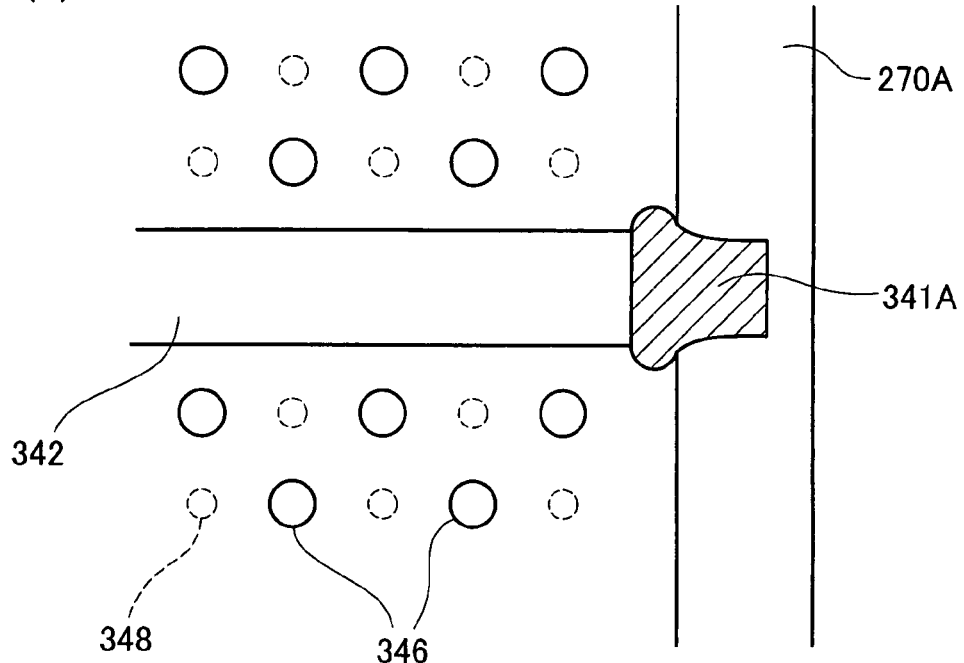
(B)
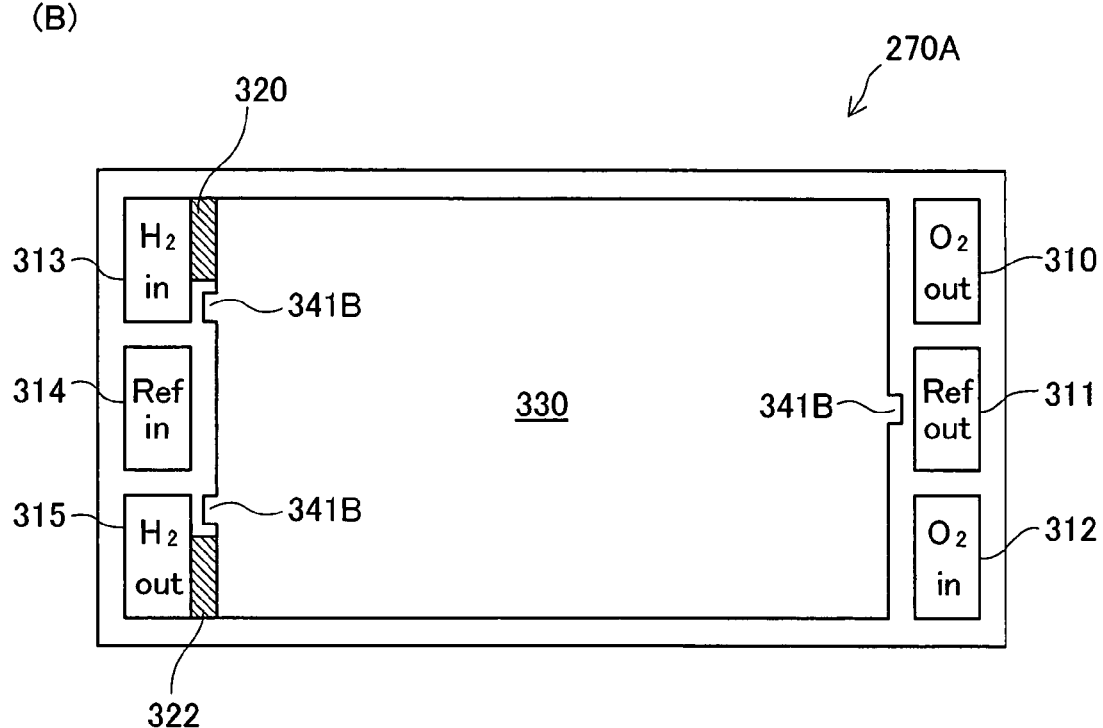

Fig.19
(A)
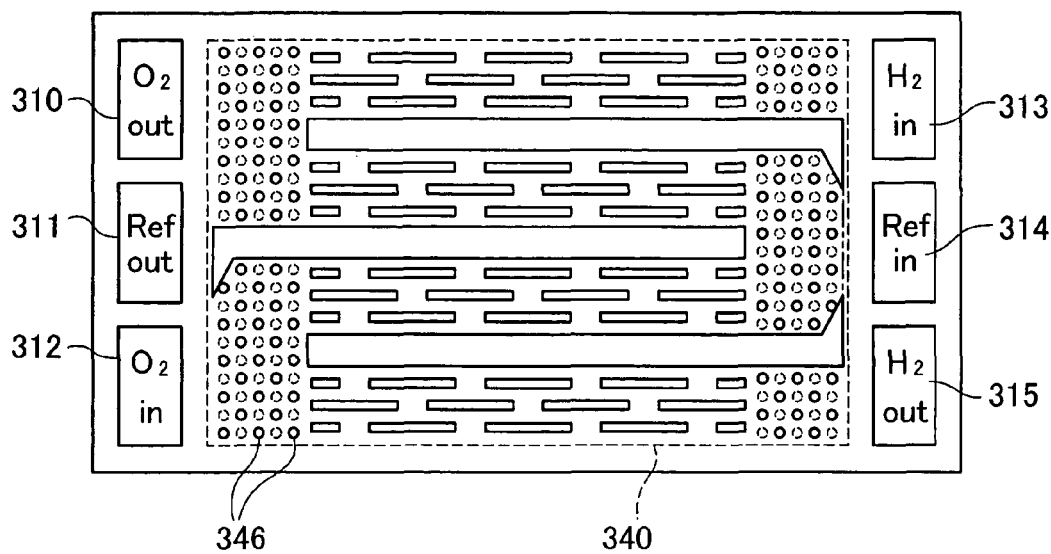
(B)
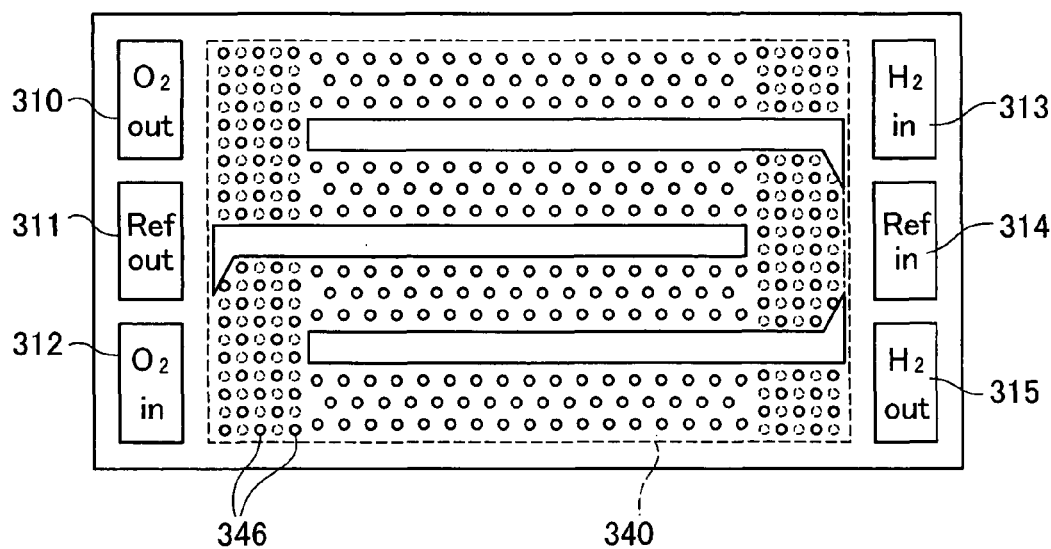

FUEL CELL AND FUEL CELL SEPARATOR

TECHNICAL FIELD

The present invention relates to the structure of a fuel cell and the structure of a fuel cell separator.

BACKGROUND ART

Separators for fuel cells (fuel cell separators) may be manufactured by press-forming. For example, one proposed technique press-forms an adequate concavo-convex structure on each fuel cell separator.

The method of press-forming a fuel cell separator determines the concavo-convex structure of the separator by noting the shape of only one face of the separator, for example, for formation of a reactive gas flow path or for formation of a refrigerant flow path, and does not specifically pay attention to the shape of the other face formed as the reverse of the concavo-convex structure. This is ascribed to the difference between required properties and characteristics for the reactive gas flow path and those for the refrigerant flow path. The prior art press-forming method thus requires production of different separators for the reactive gas flow path and for the refrigerant flow path. Another disadvantage of the prior art method is lowered electrical conductivity and lowered heat conductivity.

DISCLOSURE OF THE INVENTION

The object of the present invention is thus to eliminate the drawbacks of the prior art and to provide a technique of inextricably forming flow paths on the two faces of a fuel cell separator.

In order to attain at least part of the above and the other related objects, the present invention is directed to a first fuel cell that comprises an electrolyte assembly, and a separator having one face as a gas flow path-forming face with a gas flow path formed thereon to allow flow of a reactive gas and the other face, which is reverse to the one face, as a refrigerant flow path-forming face with a refrigerant flow path formed thereon to allow flow of a refrigerant.

The gas flow path-forming face of the separator has multiple linear gas flow paths that are arranged in parallel to one another, and a gas flow path connection structure that divides the multiple linear gas flow paths into plural linear gas flow path groups and connects at least part of the plural linear gas flow path groups in series. The refrigerant flow path-forming face has multiple linear refrigerant flow paths that are formed as a reverse structure of the multiple linear gas flow paths on the gas flow path-forming face, and a refrigerant flow path connection structure that is formed as a reverse structure of the gas flow path connection structure on the gas flow path-forming face to connect the multiple linear refrigerant flow paths in parallel.

The separator of the invention has the gas flow path-forming face for the flow of the reactive gas and the refrigerant flow path-forming face for the flow of the refrigerant as the reverse structures on its two faces. The multiple linear gas flow paths are connected in series on the gas flow path-forming face of the separator, while the multiple linear refrigerant flow paths are connected in parallel on the refrigerant flow path-forming face of the separator.

One typical example of the refrigerant flow path connection structure includes a refrigerant flow path distribution element that is located in the upstream of the multiple linear refrigerant flow paths, and a refrigerant flow path joint element that is located in the downstream of the multiple linear refrigerant flow paths. The refrigerant flow path distribution element distributes the refrigerant into the respective linear refrigerant flow paths, and the refrigerant flow path joint element merges the individual flows of the refrigerant from the respective linear refrigerant flow paths. In one preferable example, the refrigerant flow path-forming face of the separator has multiple linear refrigerant flow paths that are formed as a reverse structure of the multiple linear gas flow paths on the gas flow path-forming face, a refrigerant flow path distribution element that is formed as a reverse structure of the gas flow path connection structure at an inlet of the refrigerant flow to distribute the refrigerant into the multiple linear refrigerant flow paths, and a refrigerant flow path joint element that is formed as a reverse structure of the gas flow path connection structure at an outlet of the refrigerant flow to merge the individual flows of the refrigerant from the multiple linear refrigerant flow paths.

The separator of the invention has the gas flow path-forming face and the refrigerant flow path-forming face as the mutually reverse structures formed on its two faces. This arrangement gives the gas flow paths connected in series to form the long gas flow path and the short refrigerant flow paths connected in parallel. The two-sided separator of high formability simultaneously forms the gas flow path having the high flow velocity and the refrigerant flow paths having the little pressure loss.

The terminology of 'parallel to' means that that reactive gas and the refrigerant are flowed in the same direction or in the reverse directions. The parallel flows of the reactive gas and the refrigerant include curved or bent parallel flows as well as straight parallel flows.

The separator having the mutually reverse structures on its two faces may be a press-formed sheet metal plate or a press-formed non-metal plate made of a suitable non-metal material, such as flexible carbon. The mutually reverse structures assure the substantially uniform wall thickness. The separator of this structure may thus be manufactured with good workability by any other technique, as well as by the press-forming technique.

The technique of the invention is applicable to both separators with external manifolds and separators with internal manifolds.

In the first fuel cell of the invention, the gas flow path connection structure may have a concavo-convex shape that is separate from the multiple linear gas flow paths and is in contact with the electrolyte assembly.

The flow passage sectional area of the gas flow path connection structure is then close to the flow passage sectional area of the multiple linear gas flow paths. This arrangement advantageously prevents condensation of the water content in the reactive gas due to a pressure rise triggered by an abrupt change of the flow velocity. The concavo-convex shape has its top in contact with the electrolyte assembly, thus enhancing the strength, the rigidity, and the electric conductivity in the gas flow path connection structure of the separator.

In the first fuel cell of the invention, the gas flow path connection structure may connect all the plural linear gas flow path groups in series. This arrangement gives the gas flow path of a serpentine structure.

In one preferable embodiment of the first fuel cell of the invention, the gas flow path connection structure has a gas flow path parting beam to divide the multiple linear gas flow paths into the plural linear gas flow path groups. The gas flow path parting beam is designed in at least the gas flow path connection structure to have at least one of a greater contact width in contact with the electrolyte assembly and a higher contact pressure against the electrolyte assembly than a contact width or a contact pressure of linear gas flow path forming beams for defining the multiple linear gas flow paths.

This arrangement desirably prevents leakage of the gas flow across a gas diffusion layer of the electrolyte assembly. In order to attain the higher contact pressure of the gas flow path parting beam, the gas flow path parting beam is designed in at least the gas flow path connection structure to have a greater height than a height of the linear gas flow path forming beams in a laminating direction of the electrolyte assembly and the separator.

In another preferable embodiment of the first fuel cell of the invention, the gas flow path connection structure has a gas flow path parting beam to divide the multiple linear gas flow paths into the plural linear gas flow path groups. The gas flow path parting beam is designed in at least the gas flow path connection structure to have a greater contact width in contact with the electrolyte assembly than a contact width of linear gas flow path forming beams for defining the multiple linear gas flow paths. The refrigerant flow path-forming face of the separator has a specific linear refrigerant flow path formed as the reverse of the gas flow path parting beam. The refrigerant flow path connection structure has a flow rate control element that is designed to restrict a flow rate of the refrigerant flowed into the specific linear refrigerant flow path to be close to a flow rate of the refrigerant flowed into the multiple linear refrigerant flow paths.

In the first fuel cell of this structure, the cooling power of the multiple linear refrigerant flow paths is close to the cooling power of the specific linear refrigerant flow path. This arrangement desirably reduces a temperature variation inside the fuel cell.

In the first fuel cell of this embodiment, the flow rate control element of the refrigerant flow path connection structure may have a weir formed outside the specific linear refrigerant flow path to restrict the flow rate of the refrigerant flowed into the specific linear refrigerant flow path.

In still another preferable embodiment of the first fuel cell of the invention, the gas flow path connection structure has a gas flow path parting beam to divide the multiple linear gas flow paths into the plural linear gas flow path groups. The gas flow path parting beam is designed in at least the gas flow path connection structure to have a greater contact width in contact with the electrolyte assembly than a contact width of linear gas flow path forming beams for defining the multiple linear gas flow paths. The refrigerant flow path-forming face of the separator has a specific linear refrigerant flow path formed as the reverse of the gas flow path parting beam. The specific linear refrigerant flow path is designed to restrict a flow rate of the refrigerant flowed into the specific linear refrigerant flow path to be close to a flow rate of the refrigerant flowed into the multiple linear refrigerant flow paths.

In the first fuel cell of this embodiment, the separator may have a flow rate control member that is attached to an inside wall of the specific linear refrigerant flow path to restrict the flow rate of the refrigerant flowed into the specific linear refrigerant flow path. The separator may otherwise have a salient structure formed on the inside wall of the specific linear refrigerant flow path to increase the flow resistance.

In the first fuel cell of the invention, it is preferable that the gas flow path connection structure has a rectifier element to approximately equalize a flow velocity of the reactive gas flowed into the multiple linear gas flow paths.

This arrangement effectively prevents condensation of the reactive gas due to retention of the reactive gas or a partial pressure increase. The substantially uniform flow velocity of the reactive gas in the gas flow path connection structure contributes to enhancement of the power generation efficiency in the gas flow path connection structure.

In the fuel cell of the invention, the separator may be made of a metal.

In the fuel cell of the invention, the separator may be a press-formed sheet metal plate.

Another application of the present invention is a gas separator for a fuel cell, which includes: a conductive base plate; a first concavo-convex structure that is formed on one face of the conductive base plate to define part of an inner wall of a reactive gas flow path for allowing flow of a reactive gas; a second concavo-convex structure that is formed on the other face of the conductive base plate as the reverse of the first concavo-convex structure to define part of an inner wall of a refrigerant flow path for allowing flow of a refrigerant; and at least one parting line convex that is provided on the one face of the conductive base plate to be extended through a power generation region with the first concavo-convex structure formed thereon and to define part of the inner wall of the reactive gas flow path.

The parting line convex having one end extended toward a first position on periphery of the power generation region and the other end away from a second position on the periphery of the power generation region, which is different from the first position. The parting line convex divides the power generation region into plural divisional areas and connects the plural divisional areas of the power generation region in series via a joint area, which includes a first space between the other end of the parting line convex and the periphery of the power generation region.

The first concavo-convex structure has multiple divisional area convexes that are formed in the plural divisional areas on the one face of the conductive base plate and are arranged along multiple first lines having respective two ends away from the periphery of the power generation region to be substantially in parallel to the parting line convex. The second concavo-convex structure has a refrigerant flow convex that is formed on the other face of the conductive base plate as a reverse structure of a concave defined by the parting line convex and one of the multiple divisional area convexes and is arranged along a second line having two ends away from the periphery of a rear-face region corresponding to the power generation region to be substantially in parallel to the parting line convex.

The gas separator of the invention includes the conductive base plate having the first concavo-convex structure and the second concavo-convex structure formed on its two faces as the mutually reverse shapes. One face of the conductive base plate forms the serpentine gas flow path including the plural divisional areas connected in series via the joint area. Each of the plural divisional areas allows the flow of the reactive gas in parallel to the parting line convex, and the joint area inverts the flow direction of the reactive gas. The other face of the conductive base plate forms the refrigerant flow path that allows the flow of the refrigerant in parallel to the plural divisional areas. This arrangement simultaneously forms the flow path of the reactive gas having the high flow velocity and the flow path of the refrigerant having the small pressure loss as the mutually reverse structures on the two faces of the conductive base plate as the gas separator. The terminology of 'mutually reverse structures' means that the shape of each convex formed on one face corresponds to the shape of a concave formed on the other face and that the shape of each concave formed on one face corresponds to the shape of a convex formed on the other face.

The gas separator of the invention may have multiple parting line convexes. The multiple parting line convexes divide the power generation region into plural divisional areas and connect the plural divisional areas in series via joint areas. The multiple parting line convexes are formed in parallel to one another and are arranged successively in the direction perpendicular to the longitudinal axes of the parting line convexes to alternately change the direction of the extended ends of the parting line convexes toward the periphery of the power generation region.

In the gas separator of the invention, the at least one parting line convex may be formed integrally with the first concavo-convex structure and the second concavo-convex structure on the conductive base plate, as a convex defining a concave as its reverse shape.

In the gas separator of the invention, the at least one parting line convex is formed separately from the conductive base plate and is located on the one face of the conductive base plate.

The at least one parting line convex formed separately from the conductive base plate may be made of an electrically conductive material.

This arrangement desirably prevents an increase in internal resistance of the fuel cell and ensures the sufficient cell performance.

In one preferable embodiment of the gas separator of the invention, each of the multiple divisional area convexes is a divisional area linear convex that is continuously extended between the two ends of the first line.

This arrangement desirably increases the contact area of the separator with an adjacent member to reduce the internal resistance of the fuel cell, while improving drainage in the reactive gas flow path having part of its inner wall defined by the divisional area linear convex.

In one preferable structure of the gas separator of this embodiment, each of the multiple divisional area linear convexes has a top of a preset first length. The multiple divisional area linear convexes are arranged in the plural divisional areas at an interval of a preset second length, which is a distance between the tops of adjacent divisional area linear convexes. The multiple divisional area linear convexes are arranged at positions of phantom divisional area linear convexes in a phantom structure, which are to be formed with regularity at the interval of the preset second length over the whole first concavo-convex structure without the parting line convex.

Unit fuel cells are assembled and laminated to a fuel cell stack with adequate positioning of the gas separators. Even when the opposed gas flow path-forming faces of adjacent gas separators have parting line convexes at different positions, this arrangement enables the tops of the divisional area linear convexes formed on the opposed gas flow path-forming faces of the adjacent gas separators to be located at the corresponding overlapping positions and to be mutually supported. In formation of a refrigerant flow path by the opposed refrigerant flow path-forming faces of adjacent gas separators, the refrigerant flow convexes formed on the opposed refrigerant flow path-forming faces of the gas separators as the reverse of concaves between the respective adjoining divisional area linear convexes are in contact with each other. This arrangement effectively enhances the power collection property, the strength, and the rigidity of the fuel cell stack.

In the gas separator of this structure, it is desirable that the top of the at least one parting line convex has a width that covers over a top of one phantom divisional area linear convex, which is to be formed in place of the parting line convex and to be located between an existing pair of adjacent divisional area linear convexes located across the parting line convex in the phantom structure with the phantom divisional area linear convexes that are to be formed with regularity at the interval of the preset second length over the whole first concavo-convex structure without the parting line convex.

Unit fuel cells are assembled and laminated to a fuel cell stack with adequate positioning of the gas separators. Even when the opposed gas flow path-forming faces of adjacent gas separators have parting line convexes at different positions, this arrangement enables the top of the parting line convex formed on one separator and the top of the divisional area linear convex formed on the other separator to be located at the corresponding overlapping positions and to be mutually supported.

In another preferable embodiment of the gas separator of the invention, the refrigerant flow convex is a refrigerant flow linear convex that is continuously extended between the two ends of the second line.

This arrangement desirably increases the contact area of the tops of respective refrigerant flow convexes formed on the opposed faces of adjacent gas separators in lamination of unit fuel cells to a fuel cell stack, thus enhancing the power collection property, the strength, and the rigidity of the fuel cell stack.

In still another preferable embodiment of the gas separator of the invention, the first concavo-convex structure has multiple first projections in the joint area including a second space between one end of the divisional area convex formed on the first line and the periphery of the power generation region. The second concavo-convex structure has multiple second projections formed at positions not interfering with the multiple first projections in a rear-face area, which is reverse to the joint area and includes a third space between one end of the refrigerant flow convex formed on the second line and periphery of the rear-face area.

The use of the gas separator having the mutually reverse structures on its two faces desirably improves the flow distribution of the reactive gas into the reactive gas flow path formed on one face of the gas separator (that is, the uniformity of distribution of the reactive gas flow over the whole reactive gas flow path) as well as the flow distribution of the refrigerant into the refrigerant flow path formed on the other face of the gas separator.

In another preferable embodiment of the gas separator of the invention, the at least one parting line convex has a greater height in a thickness direction of the gas separator, compared with other convexes included in the first concavo-convex structure.

This arrangement increases the pressure applied from the gas separator to an adjacent member (that is, an electrolyte assembly including an electrolyte membrane and a pair of electrodes) in the fuel cell stack especially in the region with the at least one parting line convex, thus effectively preventing potential leakage of the gas flow between the divisional areas.

The present invention is also directed to a second fuel cell that has: an electrolyte assembly including an electrolyte membrane and an anode and a cathode formed on two faces of the electrolyte membrane; and a pair of the gas separators of the invention having any of the above structures. The gas separators are arranged across the electrolyte assembly as an anode-side gas separator and a cathode-side gas separator to define a flow path of a fuel gas to be supplied to the anode and a flow path of an oxidizing gas to be supplied to the cathode as flow paths of reactive gases.

The second fuel cell of the invention has the effects of the gas separator of the invention described above.

The present invention is further directed to a third fuel cell that is obtained as lamination of plural unit fuel cells.

Each unit fuel cell has: an electrolyte assembly including an electrolyte membrane and an anode and a cathode formed on two faces of the electrolyte membrane; and a pair of the gas separators of the invention having the multiple first projections and the multiple second projections. The gas separators are arranged across the electrolyte assembly as an anode-side gas separator and a cathode-side gas separator to define a flow path of a fuel gas to be supplied to the anode and a flow path of an oxidizing gas to be supplied to the cathode as flow paths of reactive gases.

The multiple first projections formed on the anode-side gas separator are arranged to overlap with the multiple first projections formed on the cathode-side gas separator via the electrolyte assembly in each unit fuel cell. The multiple second projections formed on the anode-side gas separator in one unit fuel cell are arranged to be in contact with the multiple second projections formed on the cathode-side gas separator in an adjacent unit fuel cell, which is adjacent to the anode-side gas separator in the one unit fuel cell.

In the third fuel cell of the invention, the first projections formed on the anode-side gas separator are located to overlap the first projections formed on the cathode-side gas separator in each unit fuel cell. The second projections formed on the anode-side gas separator of one unit fuel cell are located to be in contact with the second projections formed on the cathode-side gas separator of an adjacent unit fuel cell. This arrangement effectively enhances the power collection property, the strength, and the rigidity of the fuel cell. The mutual contact of the second projections on the opposed faces of the adjacent gas separators increases the flow passage sectional area of the refrigerant flow path formed between the adjacent gas separators, thus decreasing the pressure loss in the refrigerant flow path.

In the second fuel cell or the third fuel cell of the invention, the anode-side gas separator may have a greater number of the parting line convexes than the cathode-side gas separator.

The fuel gas flow path accordingly has the smaller flow passage sectional area than the oxidizing gas flow path. When the flow rate of the fuel gas supplied to the fuel cell is lower than the flow rate of the oxidizing gas supplied to the fuel cell, this arrangement desirably increases the flow velocity of the fuel gas and accordingly enhances the performance of the fuel cell.

In one preferable embodiment of the second fuel cell or the third fuel cell of the invention, the parting line convexes are arranged in a substantially horizontal direction on both the anode-side gas separator and the cathode-side gas separator. The fuel gas is flowed from a fuel gas flow path formed on the divisional area located on an upper side in a vertical direction to a fuel gas flow path formed on the divisional area located on a lower side in the vertical direction on the anode-side gas separator. The oxidizing gas is flowed from an oxidizing gas flow path formed on the divisional area located on the lower side in the vertical direction to an oxidizing gas flow path formed on the divisional area located on the upper side in the vertical direction on the cathode-side gas separator.

When the flow rate of the fuel gas supplied to the fuel cell is lower than the flow rate of the oxidizing gas supplied to the fuel cell, the fuel cell of this embodiment takes advantage of the gravity for drainage in the fuel gas flow path having the lower flow rate. This arrangement improves the overall drainage in the whole fuel cell and prevents deterioration of the cell performance due to accumulation of liquid water.

In another preferable embodiment of the second fuel cell or the third fuel cell of the invention, the plural divisional areas connected in series are gradually narrowed in downstream of a flow direction of the reactive gas.

The reactive gas has the higher flow velocity in the downstream of the reactive gas flow path formed by the plural divisional areas. In the downstream of the reactive gas flow path, the cell reaction consumes the greater amount of the reactive gas or electrode active material (hydrogen or oxygen) to decrease the flow rate of the reactive gas. The gradually narrowed width of the divisional areas increases the flow velocity of the reactive gas in the downstream and ensures the sufficient cell performance. The reactive gas has the greater water content in the downstream of the gas flow path. The increased flow velocity of the reactive gas in the downstream improves drainage in the downstream.

In one preferable structure of the invention, the second fuel cell or the third fuel cell further has: a sealing element that is provided between the electrolyte assembly and each of the gas separators to be arranged on at least part of the periphery of the power generation region and ensure gas sealing property in the flow path of the reactive gas; and a gas leakage preventing structure that is provided on the one face of the gas separator to fill up a clearance between the extended end of the at least one parting line convex and the sealing element arranged on the periphery of the power generation region.

The gas leakage preventing structure effectively prevents potential leakage of the gas flow between the divisional areas via the clearance. This arrangement does not cause a partial decrease in gas flow rate in the gas flow path defined by the first concavo-convex structure and keeps the substantially uniform gas flow rate over the whole gas flow path.

The technique of the invention is attained by diversity of other applications, for example, a manufacturing method of a fuel cell separator.

BRIEF DESCRIPTION OF THE DRAWINGS

FIG. 5 shows an anode gas flow path pattern 213P on a separator 261A in a second embodiment of the invention;

FIG. 6 shows an anode gas flow path pattern 214P on a separator 262A in a third embodiment of the invention;

FIG. 10 is plan views showing the structure of a separator 264A in the unit fuel cell of the fifth embodiment;

FIG. 11 is plan views showing the structure of a separator 264B in the unit fuel cell of the fifth embodiment;

FIG. 12 is a plan view schematically illustrating the structure of a resin frame 270A in the unit fuel cell of the fifth embodiment;

FIG. 13 is a plan view schematically illustrating the structure of a resin frame 270B in the unit fuel cell of the fifth embodiment;

FIG. 17 shows one modified example including another gas leakage preventing structure;

FIG. 19 shows modified structures of divisional area linear convexes.

BEST MODES OF CARRYING OUT THE INVENTION

Some modes of carrying out the invention are described below as preferred embodiments with reference to the accompanied drawings.

A. Structure of Fuel Cell Stack in First Embodiment of the Invention

Figure 1:
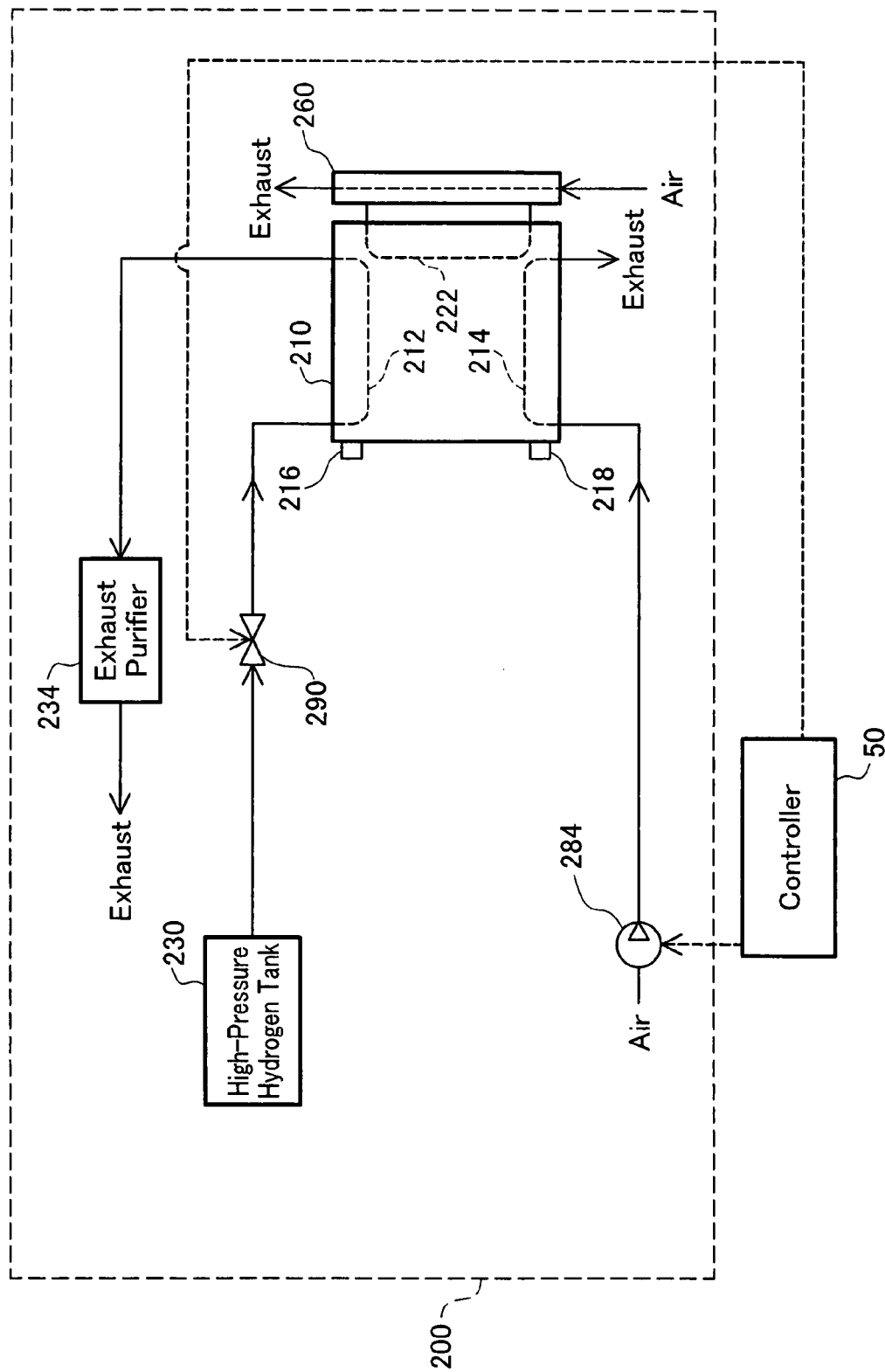
FIG. 1 schematically illustrates the configuration of a fuel cell system 200 including a fuel cell stack 210 in one embodiment of the invention.

FIG. 1 schematically illustrates the configuration of a fuel cell system 200 including a fuel cell stack 210 in one embodiment of the invention. The fuel cell stack 200 includes, in addition to the fuel cell stack 210, a high-pressure hydrogen tank 230 that stores a fuel gas (hydrogen gas) for a supply to the fuel cell stack 210, a fuel gas supply valve 290 that is operated to regulate the supply of the fuel gas, an exhaust purifier 234 that purifies an anode off gas as an exhaust from the fuel cell stack 210, an air supply pump 284 that is actuated to introduce a supply of oxidizing gas (the air) to the fuel cell stack 210, and a heat exchanger 260 that cools down the fuel cell stack 210. In the specification hereof, the terminology 'reactive gas' represents at least one of the fuel gas and the oxidizing gas.

The fuel cell stack 210 has an anode gas flow path 212, a cathode gas flow path 214, a refrigerant flow path 222, and electric power output terminals 216 and 218. The fuel gas supplied from the high-pressure hydrogen tank 230 for power generation flows through the anode gas flow path 212, while the outside air introduced as the oxidizing gas for power generation flow through the cathode gas flow path 214. Cooling water or another refrigerant LLC air-cooled in the heat exchanger 260 is introduced into the refrigerant flow path 222.

Figure 2:
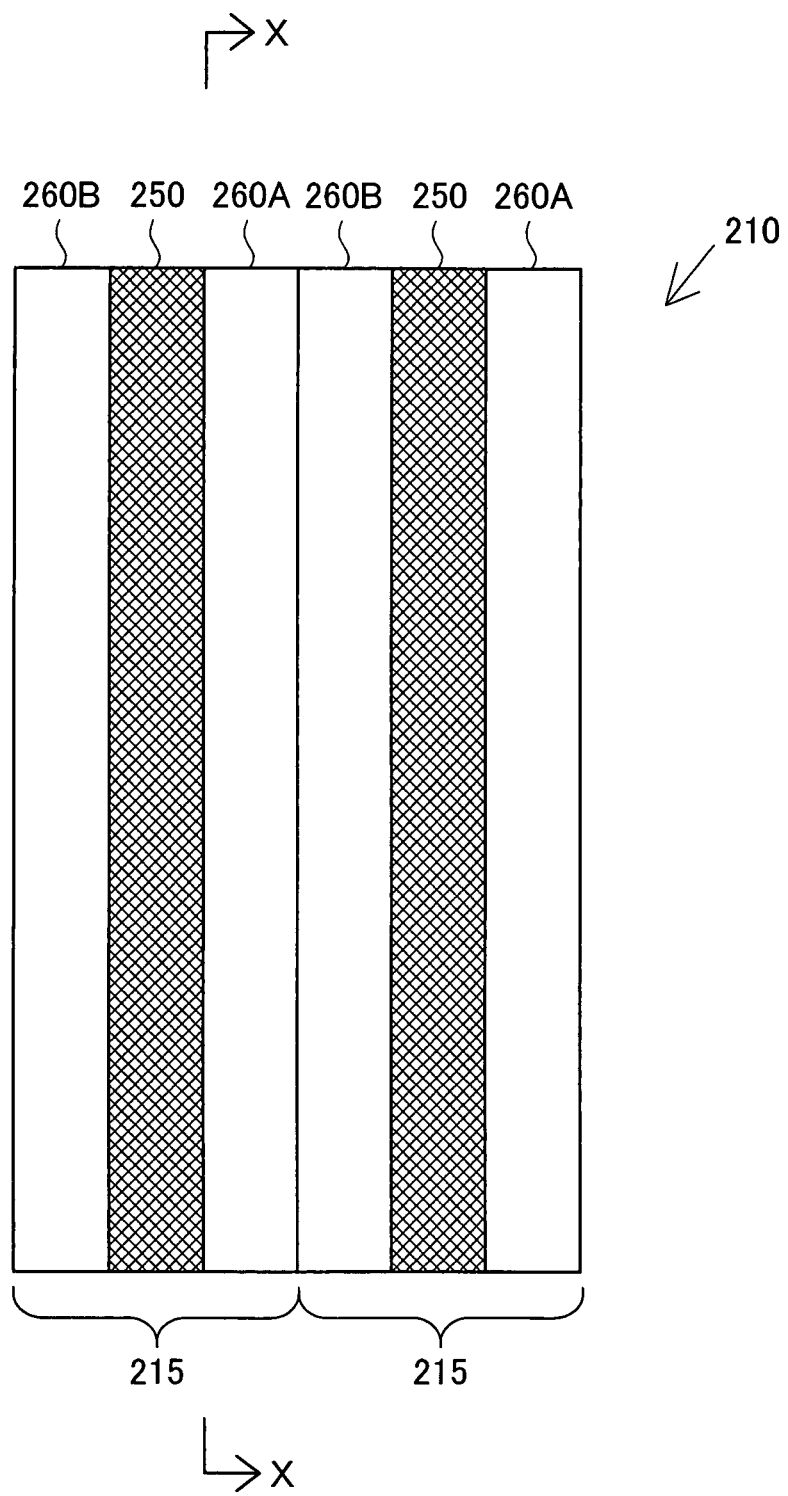
FIG. 2 shows a lamination structure of unit fuel cells 215 included in the fuel cell stack 210 in a first embodiment of the invention.

FIG. 2 shows a lamination structure of unit fuel cells 215 included in the fuel cell stack 210 in a first embodiment of the invention. Each unit fuel cell 215 has an electrolyte assembly 250 of an electrolyte membrane and electrodes (not shown) and two separators 260A and 260B arranged to support the electrolyte assembly 250 therebetween. An anode gas flow path is formed on one face of the separator 260A to introduce the supply of fuel gas or anode gas to the electrolyte assembly 250, while an oxidizing gas flow path is formed on one face of the separator 260B to introduce the supply of oxidizing gas (the air in this embodiment) to the electrolyte assembly 250. The other faces of the separators 260A and 260B are in contact with each other to define a refrigerant flow path to allow the flow of the refrigerant LLC. These refrigerant flow path-forming faces are respectively reverse to the reactive gas flow path-forming faces of the separators 260A and 260B.

Figure 3:
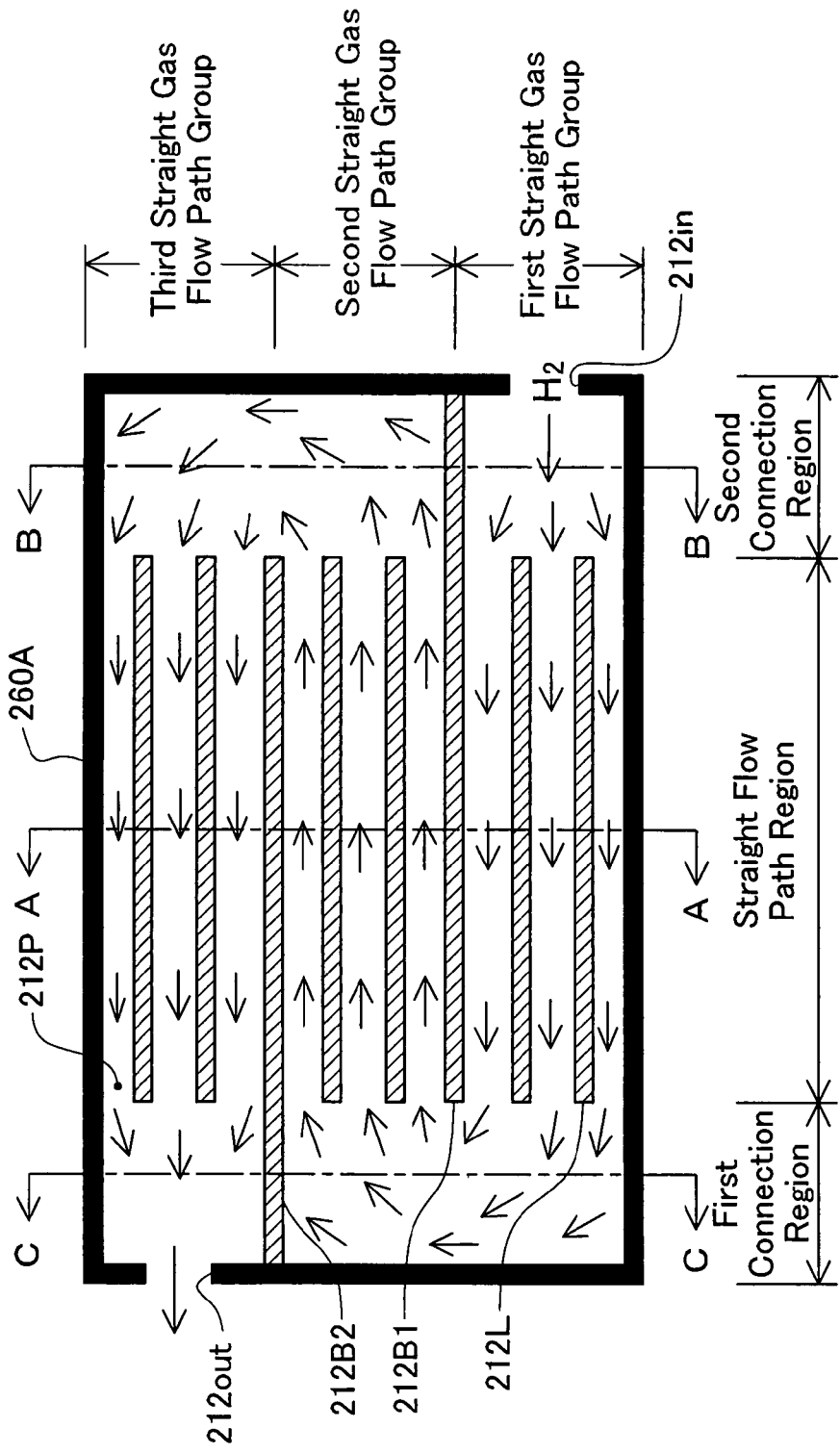
FIG. 3 shows an anode gas flow path pattern 212P, taken on a cross section XX of the unit fuel cell 215.

FIG. 3 shows an anode gas flow path pattern 212P on a cross section XX of the unit fuel cell 215. The anode gas flow path pattern 212P has an independent serpentine structure connecting an anode gas inlet 212in to an anode gas outlet 212out. The anode gas flow path pattern 212P of this embodiment has a straight flow path region, a first connection region, and a second connection region defined by a number of straight gas flow path forming beams 212L and two gas flow path parting beams 212B1 and 212B2. In the illustration of FIG. 3, hatched areas indicate contact areas of the separator 260A that are in contact with the electrolyte assembly 250. Black solid areas indicate a sealing element of a resin frame. The resin frame is located between the electrolyte assembly 250 and the separator 260A and is arranged to surround the periphery of the anode gas flow path pattern 212P as shown in FIG. 3.

The straight flow path region has multiple straight gas flow paths defined by the straight gas flow path forming beams 212L. The multiple straight gas flow paths are divided into a first straight gas flow path group, a second straight gas flow path group, and a third straight gas flow path group by the two gas flow path parting beams 212B1 and 212B2. The first straight gas flow path group and the second straight gas flow path group are connected in series by the first connection region. The second straight gas flow path group and the third straight gas flow path group are connected in series by the second connection region.

The independent serpentine structure is constructed to satisfy the following conditions:

(1) the anode gas introduced through the anode gas inlet 212in of the first connection region is flowed into the first straight gas flow path group;

(2) the anode gas flowing through the first straight gas flow path group is inverted in the first connection region to have a reverse flow and is flowed into the second straight gas flow path group; and (3) the anode gas flowing through the second straight gas flow path group is inverted in the second connection region to have a reverse flow, flows through the third straight gas flow path group, and is discharged from the anode gas outlet 212out.

Figure 4:
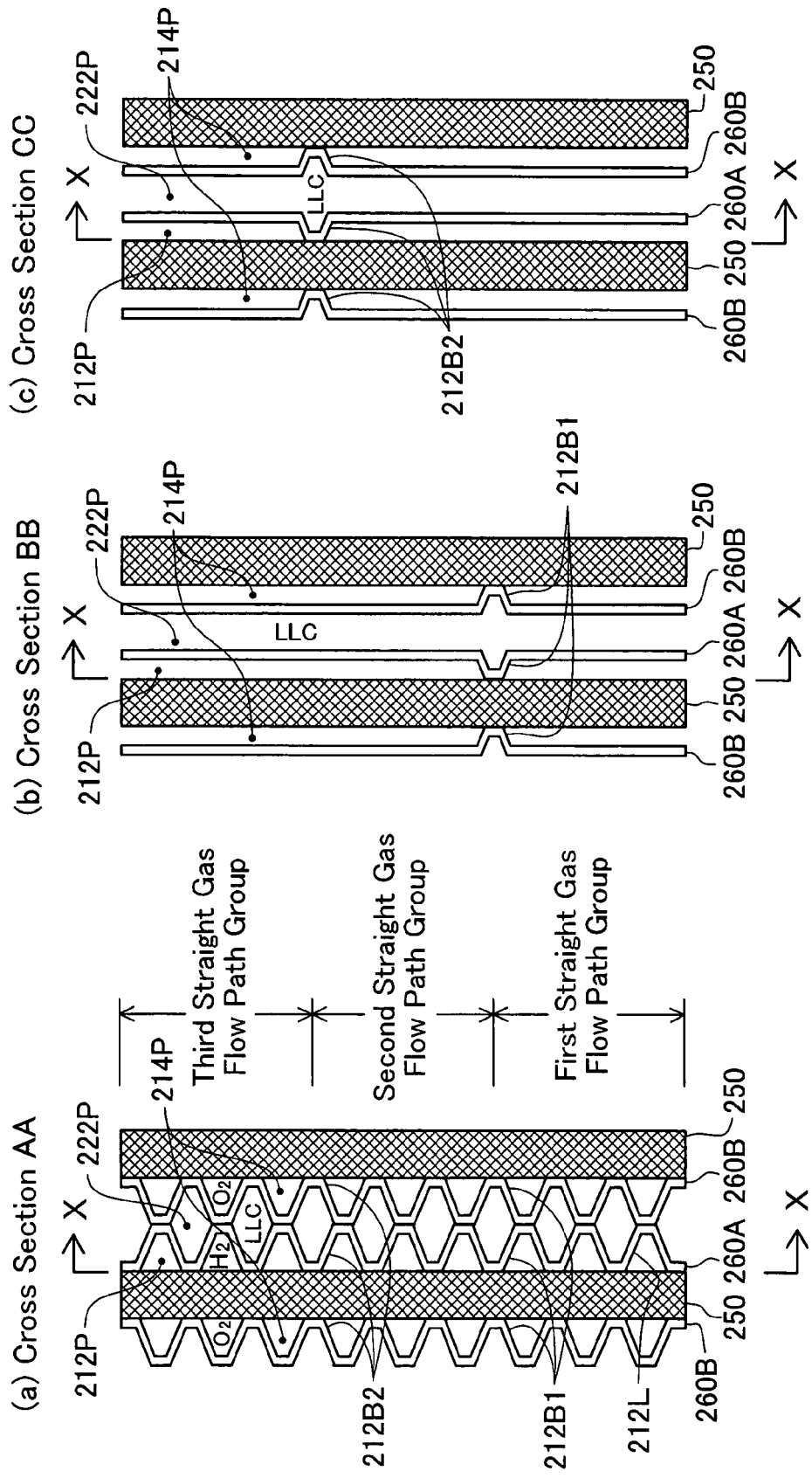
FIG. 4 is sectional views showing the fuel cell stack 210 in its laminating direction in the first embodiment of the invention.

FIG. 4 is sectional views showing the fuel cell stack 210 in its laminating direction in the first embodiment of the invention. These drawings show the positional relation among the flow path of the oxidizing gas, the flow path of the refrigerant LLC, and the flow path of the anode gas in the fuel cell stack 210.

The three flow paths, that is, the anode gas flow path, the oxidizing gas flow path, and the refrigerant flow path, defined by the two separators 260A and 260B have a mutually organic relation. The two separators 260A and 260B are pressed sheet metal plates with inextricably linked concaves and convexes as mutually reverse structures formed on their respective two faces to define the flow paths as shown in FIG. 4.

FIG. 4(a) shows a cross section AA of the straight flow path region in the fuel cell stack 210. The anode gas flow path pattern 212P on the cross section AA includes the multiple straight gas flow paths defined by the number of straight gas flow path forming beams 212L (only the lower most beam has the indication in FIGS. 3 and 4) and the two gas flow path parting beams 212B1 and 212B2 and divided into the first straight gas flow path group, the second straight gas flow path group, and the third straight gas flow path group. A refrigerant flow path pattern 222P on the cross section AA has multiple straight refrigerant flow paths formed as the reverse of the multiple straight gas flow paths.

FIG. 4(b) shows a cross section BB of the second connection region in the fuel cell stack 210. The anode gas flow path pattern 212P on the cross section BB includes a connection region of connecting the anode gas inlet 212in to the first straight gas flow path group and a connection region of connecting the second straight gas flow path group and the third straight gas flow path group in series, which are parted by the gas flow path parting beam 212B1. The refrigerant flow path pattern 222P on the cross section BB is not parted by the gas flow path parting beam 212B1 and has multiple straight refrigerant flow paths connected in parallel without partition.

FIG. 4(c) shows a cross section CC of the first connection region in the fuel cell stack 210. The anode gas flow path pattern 212P on the cross section CC includes a connection region of connecting the first straight gas flow path group and the second straight gas flow path group in series and a connection region of connecting the third straight gas flow path group to the anode gas outlet 212out, which are parted by the gas flow path parting beam 212B2. The refrigerant flow path pattern 222P on the cross section CC is not parted by the gas flow path parting beam 212B2 and has multiple straight refrigerant flow paths connected in parallel without partition.

In the structures of this embodiment and subsequent embodiments, an oxidizing gas flow path pattern 214P is formed symmetrical with the anode gas flow path pattern 212P and accordingly has the similar construction to that of the anode gas flow path pattern 212P. The symmetrical arrangement of the anode gas flow path pattern 212P and the oxidizing gas flow path pattern 214P causes the straight gas flow path forming beams 212L and the gas flow path parting beams 212B1 and 212B2 of the separator 260A and straight gas flow path forming beams 212L and gas flow path parting beams 212B1 and 212B2 of the separator 260B in one unit fuel cell 215 to come into contact with the respective opposed faces of the electrolyte assembly 250 at equivalent positions, as shown in FIG. 4(a). The symmetrical arrangement of the anode gas flow path pattern 212P and the oxidizing gas flow path pattern 214P causes the straight refrigerant flow paths formed as the reverse of the straight gas flow paths on the separators 260A and 260B of adjacent unit fuel cells 215 to come into contact with each other at respective equivalent positions and define the refrigerant flow path pattern 222P, as shown in FIG. 4(a).

The multiple straight gas flow paths defined by the multiple straight gas flow path forming beams 212L and the two gas flow path parting beams 212B1 and 212B2 of the embodiment are equivalent to the 'multiple linear gas flow paths' in the claims of the invention. The combination of the 'first connection region and the gas flow path parting beam 212B2' with the 'second connection region and the gas flow path parting beam 212B1' is one example of the 'gas flow path connection structure' in the claims of the invention.

In the structure of the first embodiment described above, the multiple straight gas flow paths are divided into the three straight gas flow path groups, which are connected in series. The multiple straight refrigerant flow paths are connected in parallel without partition. Each of the separators has the gas flow path-forming face and the refrigerant flow path-forming face formed as the mutually reverse structures on its two faces. This arrangement gives the gas flow paths connected in series to form the long gas flow path and the short refrigerant flow paths connected in parallel. The two-sided separator of high formability simultaneously forms the gas flow path having the high flow velocity and the refrigerant flow paths having the little pressure loss.

B. Structure of Fuel Cell Stack in Second Embodiment of the Invention

FIG. 5 shows an anode gas flow path pattern 213P on a separator 261A in a second embodiment of the invention. The primary different from the anode gas flow path pattern 212P of the first embodiment is that the anode gas flow path pattern 213P of the second embodiment has multiple projections 261C protruded into the anode gas flow path.

The multiple projections 261C are provided to prevent the potential blockage of the anode gas flow due to condensation of the anode gas in the first connection region and in the second connection region. The condensation of the anode gas is ascribed to the lowered flow rate of the anode gas in the first and second connection regions and resulting liquefaction of the water content included in the anode gas. The flow rate of the anode gas is lowered by conversion of the kinetic energy into the pressure energy in the flow of the anode gas from the straight gas flow path groups into the respective connection regions (Bernoulli's theory). The energy conversion is triggered by the greater flow passage sectional areas of the first connection region and the second connection region than the flow passage sectional areas of the straight gas flow path groups. Reduction of the flow passage sectional areas of the first connection region and the second connection region thus suppresses the energy conversion. The multiple projections 261C reduce the flow passage sectional areas of the first connection region and the second connection region to keep the flow rate constant.

The structure of the second embodiment has the multiple projections 261C to reduce the flow passage sectional areas of the first connection region and the second connection region, thus preventing the potential blockage of the anode gas flow due to condensation of the anode gas in the first connection region and in the second connection region.

In the structure of the second embodiment, the tops of the multiple projections 261C are in contact with the electrolyte assembly 250. The multiple projections 261C thus function to enhance the strength and the rigidity of the separator 261A and improve the electrical conductivity in the first connection region and the second connection region. As shown in FIG. 5(b), a separator 261B on the cathode side is formed symmetrical with the separator 261A on the anode side. The tops of the multiple projections 261C formed on the separator 261A and those of the multiple projections 261C formed on the separator 261B in one unit fuel cell are in contact with the respective opposed faces of the electrolyte assembly 250 at equivalent positions. The symmetrical arrangement on the anode side and on the cathode side causes multiple projections protruded on the refrigerant flow path-forming faces of the separators 261A and 261B in adjacent unit fuel cells to be in contact with each other at respective equivalent positions. The projections on the refrigerant flow path-forming face is reverse to the gas flow path-forming face with the multiple projections 261C in the first connection region and the second connection region.

The structure of the second embodiment has similar projections at an anode gas inlet and an anode gas outlet. The projections at the anode gas inlet function to attain the homogeneous distribution of the anode gas flow into the multiple straight gas flow paths. The projections at the anode gas outlet function to prevent the potential condensation of the anode gas.

C. Structure of Fuel Cell Stack in Third Embodiment of the Invention

FIG. 6 shows an anode gas flow path pattern 214P on a separator 262A in a third embodiment of the invention. The primary differences from the anode gas flow path pattern 213P of the second embodiment are: (1) the thickness of gas flow path parting beams 262B in the gas flow path pattern 214P of the third embodiment is about 1.5 times as much as the thickness of the straight gas flow path forming beams 212L (see FIG. 6(*a*)); and (2) the gas flow path pattern 214P of the third embodiment has a refrigerant control weir 262D protruded in the refrigerant flow path at a position in the vicinity of a straight refrigerant flow path formed as the reverse of the gas flow path parting beam 262B (see FIGS. 6(*b*) and 6(*c*)). Separator 262A also includes multiple projections 262C. These projections are similar to projections 261C shown in FIG. 5 and may have a similar function as those described above.

As shown in FIG. 6(*a*), the gas flow path parting beams 262B have the 1.5-fold thickness of the straight gas flow path forming beams 212L, in order to prevent the potential gas leakage from the first straight gas flow path group to the second straight gas flow path group. The leakage of the gas flow occurs via a gas diffusion layer of the electrolyte assembly 250. The increased width of the gas flow path parting beams 262B in contact with the electrolyte assembly 250 effectively prevents the potential gas leakage. The increased contact pressure of the gas flow path parting beams 262B in contact with the electrolyte assembly 250 may also prevent the potential gas leakage. The increased height of the gas flow path parting beams 262B in the laminating direction leads to the increased contact pressure of the gas flow path parting beams 262B in contact with the electrolyte assembly 250.

The refrigerant control weir 262D is provided to prevent supercooling of the refrigerant LLC in a straight refrigerant flow path formed as the reverse of the gas flow path parting beam 262B. The gas flow path parting beams 262B have the 1.5-fold thickness of the straight gas flow path forming beams 212L. The straight refrigerant flow path formed as the reverse of the gas flow path parting beam 262B accordingly has the 1.5-fold wideness of the straight refrigerant flow paths formed as the reverse of the straight gas flow path forming beams 212L (see FIG. 6(*b*)). The wide straight refrigerant flow path may cause supercooling of the refrigerant LLC.

The refrigerant control weir 262D is located in the neighborhood of the inlet of the straight refrigerant flow path formed as the reverse of the gas flow path parting beam 262B to control the flow rate of the refrigerant LLC flowed into the straight refrigerant flow path. In the structure of the third embodiment, the refrigerant control weir 262D has an elliptical shape with its long axis perpendicular to the straight refrigerant flow path as shown in FIG. 6(*b*). The elliptical shape of the refrigerant control weir 262D ensures the effective control of the flow rate of the refrigerant LLC.

A flow rate control member 262E may additionally be provided in the straight refrigerant flow path formed as the reverse of the gas flow path parting beam 262B to control the flow rate of the refrigerant LLC in the straight refrigerant flow path. Another available technique may coat the straight refrigerant flow path with a thermally insulating material to prevent supercooling of the refrigerant LLC. The flow rate control structure of this embodiment hardly lowers the total cooling capacity and is thus advantageous over the other techniques.

D. Structure of Fuel Cell Stack in Fourth Embodiment of the Invention

Figure 7:
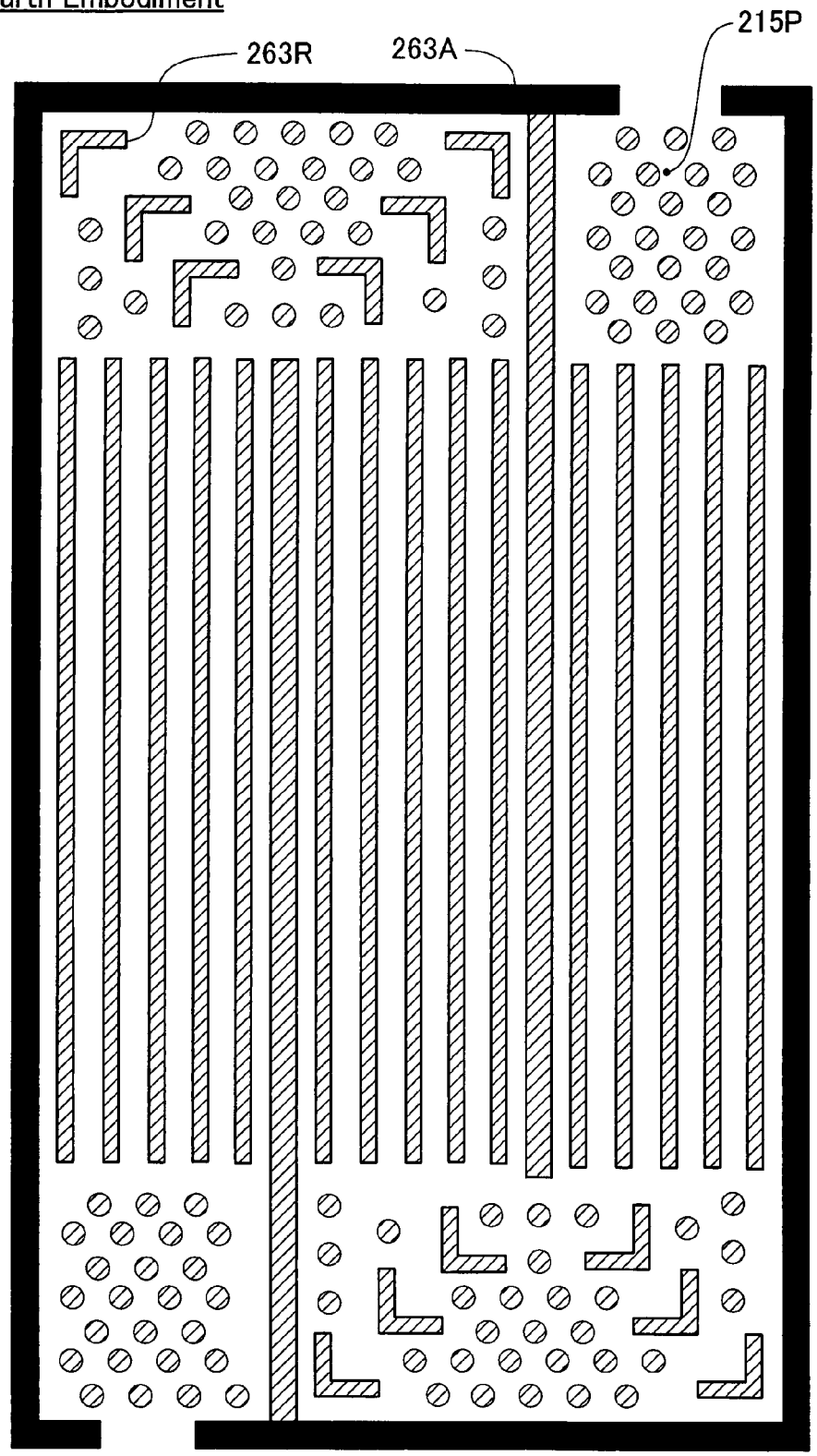
FIG. 7 shows an anode gas flow path pattern 215P on a separator 263A in a fourth embodiment of the invention.

FIG. 7 shows an anode gas flow path pattern 215P on a separator 263A in a fourth embodiment of the invention. The primary difference from the anode gas flow path pattern 213P of the second embodiment is that the anode gas flow path pattern 215P of the fourth embodiment has rectifier elements 263R provided to substantially homogenize the flow of the anode gas in the first connection region and in the second connection region.

The rectifier elements 263R substantially homogenizes the flow of the anode gas in the respective connection regions, thus effectively preventing condensation of the anode gas due to retention of the anode gas or a partial pressure increase. The substantially uniform flow velocity in the connection regions contributes to enhancement of the power generation efficiency in the connection regions.

In the structures of the first through the third embodiments, the multiple straight gas flow paths are divided into the three straight gas flow path groups and are connected in series to form the independent serpentine structure. In one modified arrangement, multiple straight gas flow paths may be divided into four straight gas flow path groups and may be connected to form two independent serpentine structures.

E. Fifth Embodiment

Figure 8:
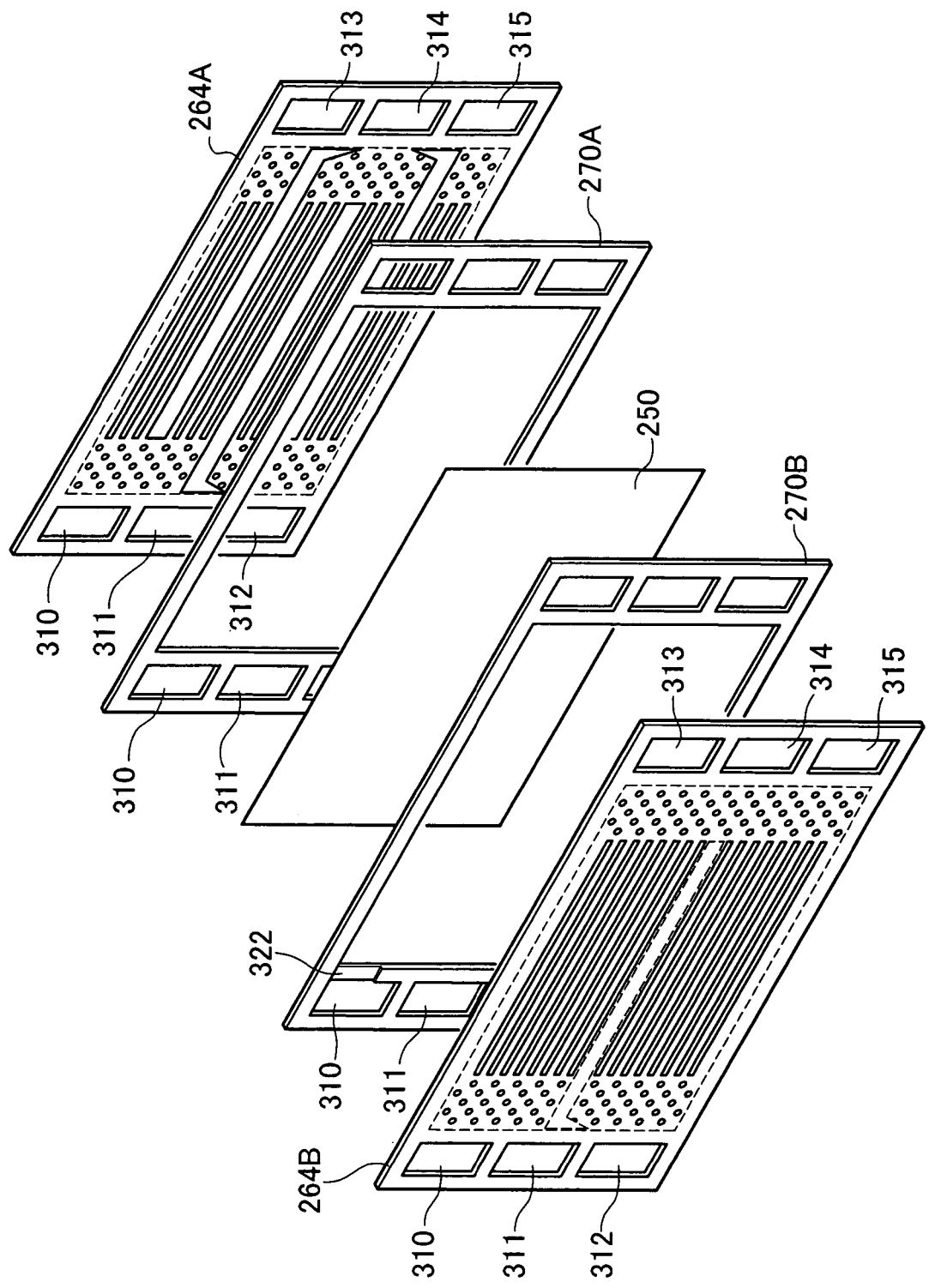
FIG. 8 is a decomposed perspective view schematically illustrating the structure of a unit fuel cell in a fifth embodiment of the invention.
Figure 9:
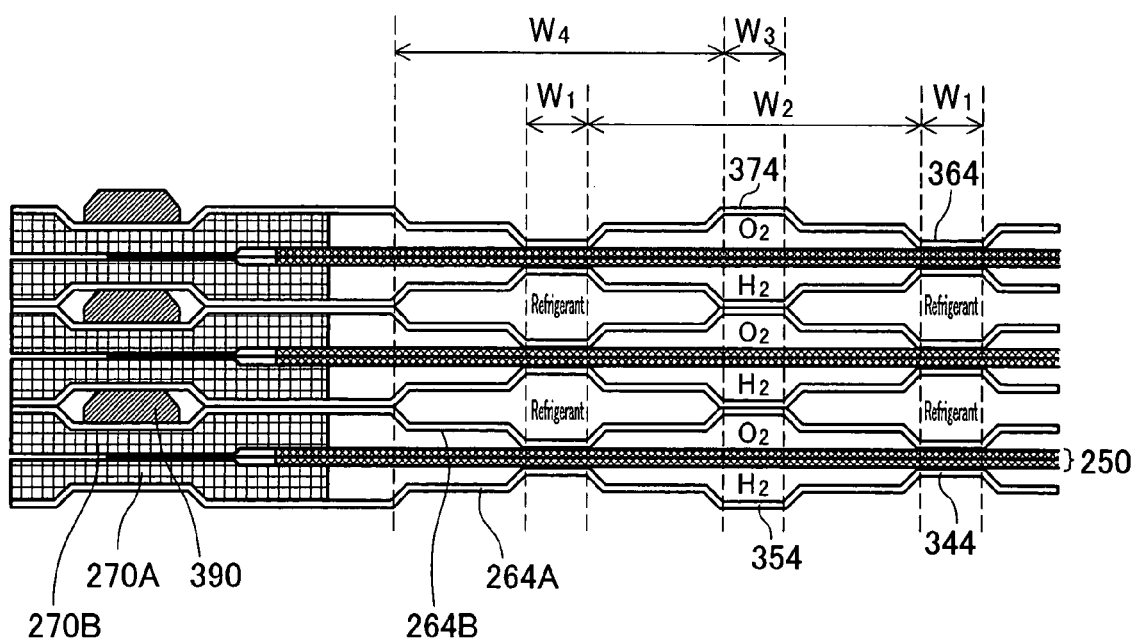
FIG. 9 is a sectional view schematically illustrating the structure of a fuel cell stack in the fifth embodiment.

FIG. 8 is a decomposed perspective view schematically illustrating the structure of a unit fuel cell in a fifth embodiment of the invention. FIG. 9 is a sectional view schematically illustrating the structure of a fuel cell stack in the fifth embodiment, which is obtained by lamination of multiple unit fuel cells of FIG. 8. The fuel cell stack of the fifth embodiment may replace the fuel cell stack 210 of the first embodiment in the fuel cell system 200 of FIG. 1. The unit fuel cell of the fifth embodiment has an electrolyte assembly 250 that is identical with the electrolyte assembly 250 in the first through the fourth embodiments, a pair of resin frames 270A and 270B that are placed across the electrolyte assembly 250 to support the periphery of the electrolyte assembly 250, and a pair of separators 264A and 264B that are placed outside the respective resin frames 270A and 270B to support the electrolyte assembly 250 interposed between the resin frames 270A and 270B. The separator 264A and the electrolyte assembly 250 in each unit fuel cell define an inner-unit cell fuel gas flow path to allow passage of the fuel gas. Spaces with the indication '$H_2$' in FIG. 9 represent the inner-unit cell fuel gas flow paths. The separator 264B and the electrolyte assembly 250 in each unit fuel cell define an inner-unit cell oxidizing gas flow path to allow passage of the oxidizing gas. Spaces with the indication '$O_2$' in FIG. 9 represent the inner-unit cell oxidizing gas flow paths. The separator 264A in one unit fuel cell and the separator 264B in an adjacent unit fuel cell define an inter-unit cell refrigerant flow path to allow passage of the refrigerant. Spaces with the indication 'Refrigerant' in FIG. 9 represent the inter-unit cell refrigerant flow paths.

FIG. 10 is plan views showing the structure of the separator 264A. FIG. 10(A) shows a gas flow path-forming face of the separator 264A, which is joined with the electrolyte assembly 250 to form the inner-unit cell fuel gas flow path. FIG. 10(B) shows a refrigerant flow path-forming face of the separator 264A, which is joined with the separator 264B of an adjacent unit fuel cell to form the inter-unit cell refrigerant flow path. Arrows A and B in FIG. 10 respectively show the horizontal direction and the vertical direction in installation of the fuel cell stack. The separator 264A is a substantially rectangular sheet metal plate that is press-formed to have concavo-convex faces and holes at preset positions. The sheet metal plate is pressed to form the desired concavo-convex shape. The concavo-convex shape on the gas flow path-forming face of the separator 264A is thus reverse to the concavo-convex shape on the refrigerant flow path-forming face. Namely the shape of a convex formed on one face corresponds to the shape of a concave formed on the other face, and the shape of a concave formed on one face corresponds to the shape of a convex formed on the other face.

As shown in FIG. 10(A), the separator 264A has holes 310, 311, and 312 formed along a circumferential side 300 in the vertical direction and holes 313, 314, and 315 along another circumferential side 305 opposite to the circumferential side 300. These holes 310 through 315 are similarly formed in the separator 264B and in the resin frames 264A and 264B as described later. In the fuel cell stack manufactured by laminating unit fuel cells of the electrolyte assembly 250, the resin frames 270A and 270B, and the separators 264A and 264B, the corresponding holes overlap to form each fluid flow path running through the fuel cell stack in its laminating direction. The holes 313 define a fuel gas supply manifold to distribute the supply of fuel gas fed from the outside of the fuel cell stack into the respective inner-unit cell fuel gas flow paths (expressed as 'H$_2$ In' in FIGS. 10 through 13). The holes 315 define a fuel gas exhaust manifold to lead the joint flow of exhaust fuel gas discharged after the electrochemical reactions on the respective unit fuel cells to the outside of the fuel cell stack (expressed as 'H$_2$ Out' in FIGS. 10 through 13). The holes 312 define an oxidizing gas supply manifold to distribute the supply of oxidizing gas fed from the outside of the fuel cell stack into the respective inner-unit cell oxidizing gas flow paths (expressed as 'O$_2$ In' in FIGS. 10 through 13). The holes 310 define an oxidizing gas exhaust manifold to lead the joint flow of exhaust oxidizing gas discharged after the electrochemical reactions on the respective unit fuel cells to the outside of the fuel cell stack (expressed as 'O$_2$ Out' in FIGS. 10 through 13). The holes 314 define a refrigerant supply manifold to lead the flow of refrigerant introduced from the outside of the fuel cell stack into the inter-unit cell refrigerant flow paths (expressed as 'Ref In' in FIGS. 10 through 13). The holes 311 define a refrigerant exhaust manifold to lead the joint flow of the refrigerant passing through the respective inter-unit cell refrigerant flow paths to the outside of the fuel cell stack (expressed as 'Ref Out' in FIGS. 10 through 13).

The gas flow path-forming face of the separator 264A has a first concavo-convex structure that is linked with one face of the electrolyte assembly 250 to form the inner wall of the inter-unit cell fuel gas flow path, that is, part of the inner wall of the fuel gas flow path. A substantially rectangular area having the first concavo-convex structure and receiving the flow of fuel gas on its surface is hereafter referred to as power generation region 340. The power generation region 340 is surrounded by the broken line in FIG. 10(A). In the fifth embodiment, the substantially rectangular first concavo-convex structure includes three parting line convexes 342, multiple divisional area linear convexes 344, and a large number of projections 346.

Each of the parting line convexes 342 has one end extended toward one side of the power generation region 340 close to one circumferential side 305 (or circumferential side 300) and the other end away from the other side of the power generation region 340 close to the other circumferential side 300 (or circumferential side 305) opposite to the circumferential side 305 (or circumferential side 300). Namely the parting line convexes 342 are extended through the power generation region 340 in the substantially horizontal direction. The parting line convex 342 has a gas leakage preventing structure provided in the vicinity of its extended end to prevent gas leakage in the gas flow path. The gas leakage preventing structure will be described later in detail.

The divisional area linear convexes 344 are formed in the substantially horizontal direction to be practically in parallel to the parting line convexes 342. Both ends of the divisional area linear convexes 344 are away from the periphery of the power generation region 340. A preset number of (three in this embodiment) divisional area linear convexes 344 are grouped to be arranged between adjacent parting line convexes 342 or between one parting line convex 342 and the periphery of the power generation region 340. Each area defined by the parting line convexes 342 to have a group of divisional area linear convexes 344 is hereafter referred to as divisional area 380. In the structure of the fifth embodiment, four divisional areas 380 are formed by the three parting line convexes 342. The respective divisional areas 380 are surrounded by the one-dot chain line in FIG. 10(A).

The projections 346 are arranged at regular intervals in an area including a first space, which is defined by the other end of the parting line convex 342 and the periphery of the power generation region 340, and a second space, which is defined by the ends of the divisional area linear convexes 344 formed in two divisional areas 380 arranged across the parting line convex 342 and the periphery of the power generation region 340. Each patch of this area with plural projections 346 arranged at regular intervals is hereafter referred to as joint area 382. In the structure of the fifth embodiment, three joint areas 382 are formed in the vicinity of the respective other ends of the three parting line convexes 342. The joint areas 382 are surrounded by the two-dot chain line in FIG. 10(A). The projections 346 are also arranged at regular intervals in end spaces of the power generation region 340 in the vicinity of the holes 313 and 315, which are defined by the ends of the divisional area linear convexes 344 and the periphery of the power generation region 340. These end spaces are hereafter referred to as flow in-out areas 384. The flow in-out areas 384 are also surrounded by the two-dot chain line in FIG. 10(A). A large number of concaves 348 are arranged at regular intervals between the regularly arranged projections 346 in the joint areas 382 and in the flow in-out areas 384. The projections 346 are shown by closed circles and the concaves 348 are shown by open circles of the dotted line in FIG. 10(A). Projections and concaves formed on the refrigerant flow path-forming face of the separator 264A shown in FIG. 10(B) and projections and concaves formed on the separator 264B shown in FIG. 11 are similarly shown by closed circles and open circles of the dotted line.

In the structure of the fifth embodiment, the parting line convexes 342 having the ends extended toward the side of the power generation region 340 close to the circumferential side 305 and the parting line convex 342 having the end extended toward the side of the power generation region 340 close to the circumferential side 300 are arranged alternately. This arrangement of the parting line convexes 342 to alternately change the direction of their extended ends on the periphery of the power generation region 340 enables the four divisional areas 380 to be connected in series via the respective joint areas 382.

The refrigerant flow path-forming face of the separator 264A has a second concavo-convex structure in a rear face region reverse to the power generation region 340 (the rear face region is collectively called the power generation region 340 in the description below), which is linked with the opposed face of the adjacent separator 264B to form the inner wall of the inter-unit cell refrigerant flow path, that is, part of the inner wall of the refrigerant flow path. In the fifth embodiment, the second concavo-convex structure includes multiple refrigerant flow linear convexes 354 and a large number of projections 358 as shown in FIG. 10(B).

The refrigerant flow linear convexes 354 are formed in the substantially horizontal direction to be practically in parallel to the parting line convexes 342 on the gas flow path-forming face. Both ends of the refrigerant flow linear convexes 354 are away from the periphery of the power generation region 340. The refrigerant flow linear convexes 354 on the refrigerant flow path-forming face are reverse of the concaves formed between the adjacent divisional area linear convexes 344 and between the divisional area linear convex 344 and the parting line convex 342 on the gas flow path-forming face. The projections 358 are reverse of the concaves 348 formed in the joint areas 382 and the flow in-out areas 384 on the gas flow path-forming face. The refrigerant flow path-forming face of the separator 264A also has concaves 356, which are reverse of the projections 346 formed on the gas flow path-forming face.

FIG. 11 is plan views showing the structure of the separator 264B. FIG. 11(A) shows a gas flow path-forming face of the separator 264B, which is joined with the electrolyte assembly 250 to form the inner-unit cell oxidizing gas flow path. FIG. 11(B) shows a refrigerant flow path-forming face of the separator 264B, which is joined with the separator 264A of an adjacent unit fuel cell to form the inter-unit cell refrigerant flow path. The separator 264B is a sheet metal plate that has a practically identical contour with that of the separator 264A and is press-formed to have concavo-convex faces and holes formed at preset positions in the same manner as the separator 264A.

The gas flow path-forming face of the separator 264B has a first concavo-convex structure that is linked with one face of the electrolyte assembly 250 to form the inner wall of the inter-unit cell oxidizing gas flow path, that is, part of the inner wall of the oxidizing gas flow path. A substantially rectangular area having the first concavo-convex structure and receiving the flow of oxidizing gas on its surface is hereafter referred to as power generation region 340. The power generation region 340 is surrounded by the broken line in FIG. 11(A). In the fifth embodiment, the substantially rectangular first concavo-convex structure includes one parting line convex 362, multiple divisional area linear convexes 364, and a large number of projections 366.

Like the parting line convexes 342, the parting line convex 362 has one end extended toward a first position on the periphery of the power generation region 340 and the other end away from a second position opposite to the first position on the periphery of the power generation region 340. Namely the parting line convex 362 is extended through the power generation region 340 in the substantially horizontal direction. The divisional area linear convexes 364 are formed in the substantially horizontal direction to be practically in parallel to the parting line convex 362. Both ends of the divisional area linear convexes 364 are away from the periphery of the power generation region 340. A preset number of (eight in this embodiment) divisional area linear convexes 364 are grouped to be arranged between the parting line convex 362 and the periphery of the power generation region 340. Each area having a group of divisional area linear convexes 364 is hereafter referred to as divisional area 380. In the structure of the fifth embodiment, two divisional areas 380 are formed by one parting line convex 362. The projections 366 and concaves 368 are arranged at regular intervals in a joint area 382 including a first space between the other end of the parting line convex 362 and the periphery of the power generation region 340 and a second space between the ends of the divisional area linear convexes 364 and the periphery of the power generation region 340. In the structure of the fifth embodiment, one joint area 382 is formed in the vicinity of the other end of one parting line convex 362. The projections 366 and the concaves 368 are also arranged at regular intervals in flow in-out areas 384 of the power generation region 340 in the vicinity of the holes 310 and 312, like the separator 264A. Formation of one parting line convex 362 connects the two divisional areas 380 in series via the joint area 382 in the separator 264B.

The refrigerant flow path-forming face of the separator 264B has a second concavo-convex structure in the power generation region 340, which is linked with the opposed face of the adjacent separator 264A to form the inner wall of the inter-unit cell refrigerant flow path, that is, part of the inner wall of the refrigerant flow path. In the fifth embodiment, the second concavo-convex structure includes multiple refrigerant flow linear convexes 374 and a large number of projections 378.

Like the refrigerant flow linear convexes 354, the refrigerant flow linear convexes 374 are formed in the substantially horizontal direction to be practically in parallel to the parting line convex 362 on the gas flow path-forming face. Both ends of the refrigerant flow linear convexes 374 are away from the periphery of the power generation region 340. The refrigerant flow linear convexes 374 on the refrigerant flow path-forming face are reverse of the concaves formed between the adjacent divisional area linear convexes 364 and between the divisional area linear convex 364 and the parting line convex 362 on the gas flow path-forming face. The projections 378 are reverse of the concaves 368 formed on the gas flow path-forming face. The refrigerant flow path-forming face of the separator 264B also has concaves 376, which are reverse of the projections 366 formed on the gas flow path-forming face.

FIG. 12 is a plan view schematically illustrating the structure of the resin frame 270A. One face of the resin frame 270A to be in contact with the separator 264A is shown in FIG. 12. The resin frame 270A has a center hole 330, which is substantially rectangular in shape and is slightly smaller than the electrolyte assembly 250. The resin frame 270A also has a concave 320 for connecting the hole 313 to the center hole 330 and a concave 322 for connecting the hole 315 to the center hole 330. The concave 320 is joined with the separator 264A to form a connection flow path for connecting the inner-unit cell fuel gas flow path to the fuel gas supply manifold formed by lamination of the holes 313. The concave 322 is joined with the separator 264A to form a connection flow path for connecting the inner-unit cell fuel gas flow path to the fuel gas exhaust manifold formed by lamination of the holes 315.

FIG. 13 is a plan view schematically illustrating the structure of the resin frame 270B. One face of the resin frame 270B to be in contact with the separator 264B is shown in FIG. 13. The resin frame 270B has a center hole 334, which is formed at a position corresponding to the hole 330 of the resin frame 270A and in the same shape as that of the hole 330. The resin frame 270 B also has a concave 324 for connecting the hole 310 to the center hole 334 and a concave 326 for connecting the hole 312 to the center hole 334. The concave 324 is joined with the separator 264B to form a connection flow path for connecting the inner-unit cell oxidizing gas flow path to the oxidizing gas exhaust manifold formed by lamination of the holes 310. The concave 326 is joined with the separator 264B to form a connection flow path for connecting the inner-unit cell oxidizing gas flow path to the oxidizing gas supply manifold formed by lamination of the holes 312.

The resin frames 270A and 270B are made of an insulating resin. The resin frames 270A and 270B are arranged to hold the electrolyte assembly 250 therebetween. This arrangement ensures the required insulation between the two faces of the electrolyte assembly 250. Each of the resin frames 270A and 270B is located between the separator 264A or 264B having the concavo-convex structure of a certain height and the electrolyte assembly 250 and works as a spacer to keep a space corresponding to the concavo-convex structure between the separator 264A or 264B and the electrolyte assembly 250.

In assembly of the unit fuel cell, the separator 264A and the resin frame 270A are joined with each other via a sealing element (not shown) of, for example, an adhesive. Similarly the separator 264B and the resin frame 270B are joined with each other via a sealing element (not shown) of, for example, an adhesive. The electrolyte assembly 250 is then interposed and bonded between the resin frames 270A and 270B via sealing elements (not shown) of, for example, an adhesive to complete a unit fuel cell. The electrolyte assembly 250 and the resin frames 270A and 270B are arranged such that the electrolyte assembly 250 covers over the center hole 330 of the resin frame 270A and the center hole 334 of the resin frame 270B. A preset number of unit fuel cells prepared as described above are successively laid one over another via sealing elements 390 of, for example, an adhesive (see FIG. 9) to give the fuel cell stack. The presence of the sealing elements between the respective pairs of adjoining elements ensures the sufficient sealing property in the inner-unit cell gas flow paths and the gas supply and exhaust manifolds. Part of the sealing elements arranged between the respective pairs of adjoining elements may be made of a material other than the adhesive. For example, the sealing elements 390 may be resin gaskets molded to a certain shape surrounding the holes of the respective manifolds and the power generation region.

In the fuel cell stack, the supply of fuel gas fed to the fuel gas supply manifold formed by lamination of the holes 313 is distributed into the inner-unit cell fuel gas flow paths formed in the respective unit fuel cells. The fuel gas in the inner-unit cell fuel gas flow path flows in the horizontal direction in the respective divisional areas 380 and as a whole downward in the vertical direction as shown in the arrows in FIG. 10(A). The contact of the parting line convexes 342 formed on the separator 264A with the electrolyte assembly 250 divides the power generation region 340 to form the serpentine flow path on the power generation region 340, while preventing the flow of the fuel gas in a direction perpendicular to the axial direction of the respective parting line convexes 342 (that is, in the vertical direction in the structure of this embodiment). The contact of the divisional area linear convexes 344 formed on the separator 264A with the electrolyte assembly 250 prevents the flow of the fuel gas in the vertical direction in the divisional areas 380 and accordingly leads the gas flow in the horizontal direction in the divisional areas 380. The fuel gas flowed through the respective inner-unit cell fuel gas flow paths and subjected to the electrochemical reaction is discharged to the fuel gas exhaust manifold formed by lamination of the holes 315.

The supply of oxidizing gas fed to the oxidizing gas supply manifold formed by lamination of the holes 312 is distributed into the inner-unit cell oxidizing gas flow paths formed in the respective unit fuel cells. The oxidizing gas in the inner-unit cell oxidizing gas flow path flows in the horizontal direction in the respective divisional areas 380 and as a whole upward in the vertical direction as shown in the arrows in FIG. 11(A). The contact of the parting line convex 362 formed on the separator 264B with the electrolyte assembly 250 divides the power generation region 340 to form the serpentine flow path on the power generation region 340, while preventing the flow of the oxidizing gas in a direction perpendicular to the axial direction of the parting line convex 362 (that is, in the vertical direction in the structure of this embodiment). The contact of the divisional area linear convexes 364 formed on the separator 264B with the electrolyte assembly 250 prevents the flow of the oxidizing gas in the vertical direction in the divisional areas 380 and accordingly leads the gas flow in the horizontal direction in the divisional areas 380. The oxidizing gas flowed through the respective inner-unit cell oxidizing gas flow paths and subjected to the electrochemical reaction is discharged to the oxidizing gas exhaust manifold formed by lamination of the holes 310.

The supply of refrigerant fed to the refrigerant supply manifold formed by lamination of the holes 314 is distributed into the inter-unit cell refrigerant flow paths formed between the respective pairs of the separators 264A and 264B. The refrigerant in the inter-unit cell refrigerant flow path flows in the horizontal direction as a whole as shown by the arrows in FIGS. 10(B) and 11(B). The mutual contact of the refrigerant flow linear convexes 354 and 374 prevents the flow of the refrigerant in a direction perpendicular to the axial direction of the refrigerant flow linear convexes 354 and 374 (that is, in the vertical direction in the structure of this embodiment) and accordingly leads the refrigerant flow in the horizontal direction. The refrigerant flowed through the inter-unit cell refrigerant flow paths is discharged to the refrigerant exhaust manifold formed by lamination of the holes 311.

The following gives the detailed description on the shapes of the respective convexes formed on the separators 264A and 264B and the positional relation of the projections in the unit fuel cell. The divisional area linear convexes 344 formed on the separator 264A and the divisional area linear convexes 364 formed on the separator 264B have practically flat tops of a fixed equal width. There is a fixed equal distance (fixed equal pitch) between the tops of the respective pairs of the adjacent divisional area linear convexes 344 or between the tops of the respective pairs of the adjacent divisional area linear convexes 364. In FIG. 9, W1 represents the width of the tops of the divisional area linear convexes 344 and the divisional area linear convexes 364, and W2 represents the pitch of the divisional area linear convexes 344 and the divisional area linear convexes 364.

There is also the fixed equal distance between one horizontal side of the separator 264A or the separator 264B and one of the divisional area linear convexes 344 or one of the divisional area linear convexes 364 closest to the horizontal side. The separator 264A has three parting line convexes 342, and the separator 264B has one parting line convex 362. The divisional area linear convexes 344 or the divisional area linear convexes 364 are, however, formed on the separator 264A or on the separator 264B with specific regularity as a whole to overlap phantom divisional area linear convexes of the fixed equal distance, which are to be formed at the fixed equal pitch over the whole gas flow path-forming face of the separator without any parting line convexes. Namely the tops of the divisional area linear convexes 344 on the separator 264A overlap the tops of the divisional area linear convexes 364 on the separator 264B across the electrolyte assembly 250 in each unit fuel cell as shown in FIG. 9. The cross section of FIG. 9 is cut in the direction perpendicular to the respective linear convexes. The position of the cross section of FIG. 9 is shown by the line 9-9 in FIG. 10(A). The sectional view of FIG. 9 specifically shows the periphery of the unit fuel cells including the resin frames 270A and 270B.

The refrigerant flow linear convexes 354 formed as the reverse of the divisional areas 380 on the separator 264A and the refrigerant flow linear convexes 374 formed as the reverse of the divisional areas 380 on the separator 264B are also arranged at a fixed equal pitch and have practically flat tops of a fixed equal width, like the divisional area linear convexes 344 and the divisional area linear convexes 364. In FIG. 9, W3 represents the width of the tops of the refrigerant flow linear convexes 354 and the refrigerant flow linear convexes 374, and W4 represents the pitch of the refrigerant flow linear convexes 354 and the refrigerant flow linear convexes 374. There is also the fixed equal distance between one horizontal side of the separator 264A or the separator 264B and one of the refrigerant flow linear convexes 354 or one of the refrigerant flow linear convexes 374 closest to the horizontal side. Namely the tops of the refrigerant flow linear convexes 354 on the separator 264A overlap the tops of the refrigerant flow linear convexes 374 on the separator 264B in each unit fuel cell as shown in FIG. 9.

Figure 14:
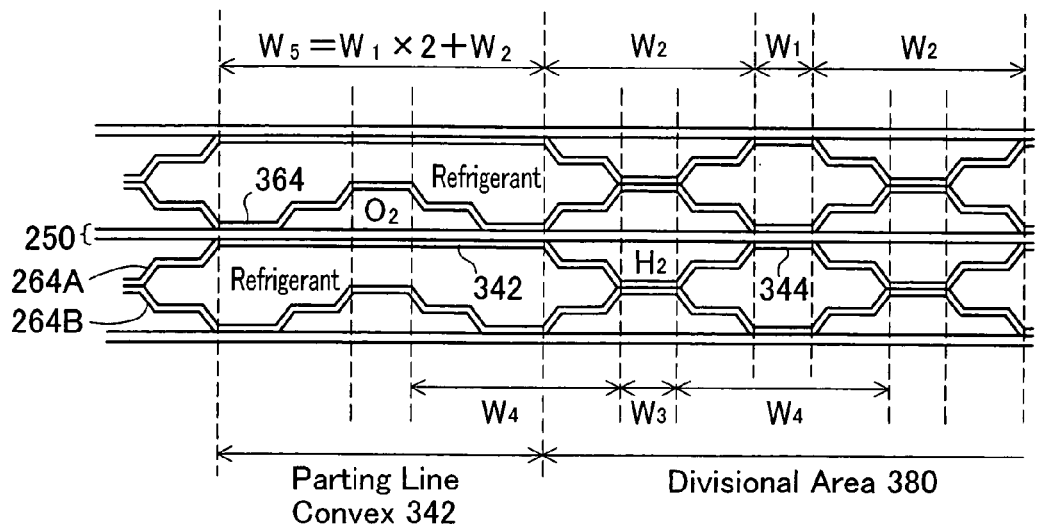
FIG. 14 is a sectional view schematically illustrating the structure of the fuel cell stack of the fifth embodiment on a cross section including parting line convexes 342.

In the structure of the fifth embodiment, the three parting line convexes 342 formed on the gas flow path-forming face of the separator 264A and the parting line convex 362 formed on the gas flow path-forming face of the separator 264B have practically flat tops of a fixed equal width. The width of the tops of the parting line convexes 342 and 362 is greater than the width of the tops of the divisional area linear convexes 344 and 364. FIG. 14 is a sectional view taken on the line 9-9 of FIG. 10(A) and schematically shows one of the three parting line convexes 342 formed on the separator 264A. In FIG. 14, W5 represents the width of the tops of the parting line convexes 342. The width W5 satisfies a relation expressed as Equation (1) given below:

$$W5 = W1 \times 2 + W2 \quad (1)$$

The tops of the parting line convexes 342 formed on the separator 264A thus overlap the tops of the respective two adjacent divisional area linear convexes 364 on the separator 264B across the electrolyte assembly 250 in each unit fuel cell. The top of the center parting line convex 342 arranged on the center among the three parting line convexes 342 formed on the separator 264A overlaps the top of the parting line convex 362 formed on the separator 264B across the electrolyte assembly 342.

Figure 15:
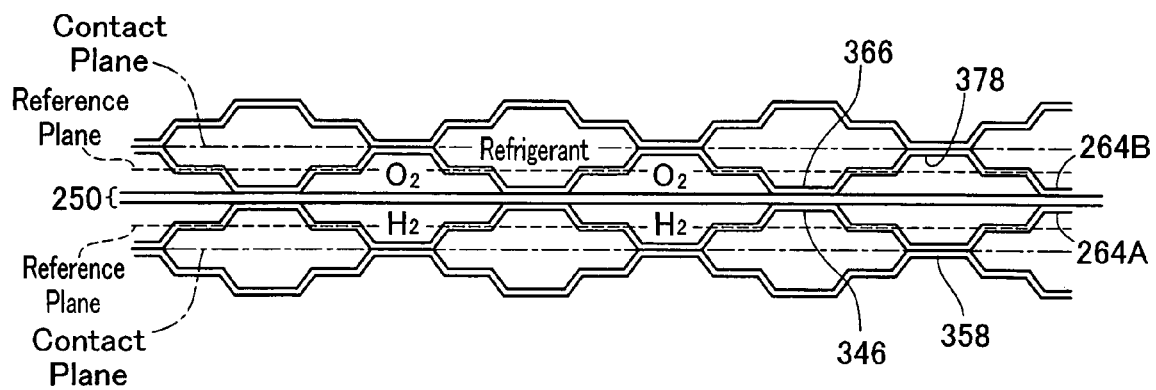
FIG. 15 is a sectional view schematically illustrating the structure of the fuel cell stack of the fifth embodiment on a cross section including projections 346 and concaves 348 in a joint area 382.

FIG. 15 is a sectional view showing the projections 346 and the concaves 348 arranged in the joint area 382 on the separator 264A in the unit fuel cell. The position of the cross section of FIG. 15 is shown by the line 15-15 in FIG. 10(A). The flow in-out areas 384 on the separator 264A and the joint area 382 and the flow in-out areas 384 on the separator 264B have the similar concavo-convex structure to that of the joint areas 382 on the separator 264A.

As shown in FIG. 10, the projections 346 and the concaves 348 of the substantially identical circular shape or the projections 366 and the concaves 368 of the substantially identical circular shape are arranged at regular intervals in the joint areas 382 and the flow in-out areas 384 on the separator 264A or on the separator 264B. The projections 346 or 366 and the concaves 348 or 368 are alternately formed at equal intervals in both the horizontal direction and the vertical direction. The projections 346 and 366 and the concaves 348 and 368 are arranged in the same pattern on the opposed faces of the respective separators 264A and 264B to be overlapped in assembly of the unit fuel cell including the separators 264A and 264B. As shown in FIG. 15, the tops of the projections 346 formed on the gas flow path-forming face of the separator 264A are arranged at the specific positions to overlap the tops of the projections 366 formed on the gas flow path-forming face of the separator 264B across the electrolyte assembly 250. The tops of the projections 358 formed on the refrigerant flow path-forming face of the separator 264A in one unit fuel cell are in contact with the tops of the projections 378 formed on the refrigerant flow path-forming face of the separator 264B in an adjoining unit fuel cell. The joint areas 382 and the flow in-out areas 384 of the respective separators 264A and 264B have a reference plane to be protruded or concaved. In the fuel cell stack manufactured by laminating separators and electrolyte assemblies, the reference plane on the refrigerant flow path-forming side is set away from a contact plane of an adjacent separator by a preset distance, while the reference plane on the gas flow path-forming side is set away from a contact plane of the adjacent electrolyte assembly 250 by a preset distance. In FIG. 15, the position of the reference plane is shown by the broken line, and the position of the contact plane on the refrigerant flow path-forming side between the separators is shown by the one-dot chain line.

The following describes the gas leakage preventing structure to prevent leakage of the gas flow between divisional areas of the gas flow path formed on the gas flow path-forming face of each separator 264A or 264B in the fuel cell stack of the embodiment. In the fifth embodiment, the gas leakage preventing structure is provided in the vicinity of the extended end of each parting line convex to prevent leakage of the gas flow between adjacent divisional areas via the clearance from the resin frame.

Figure 16:
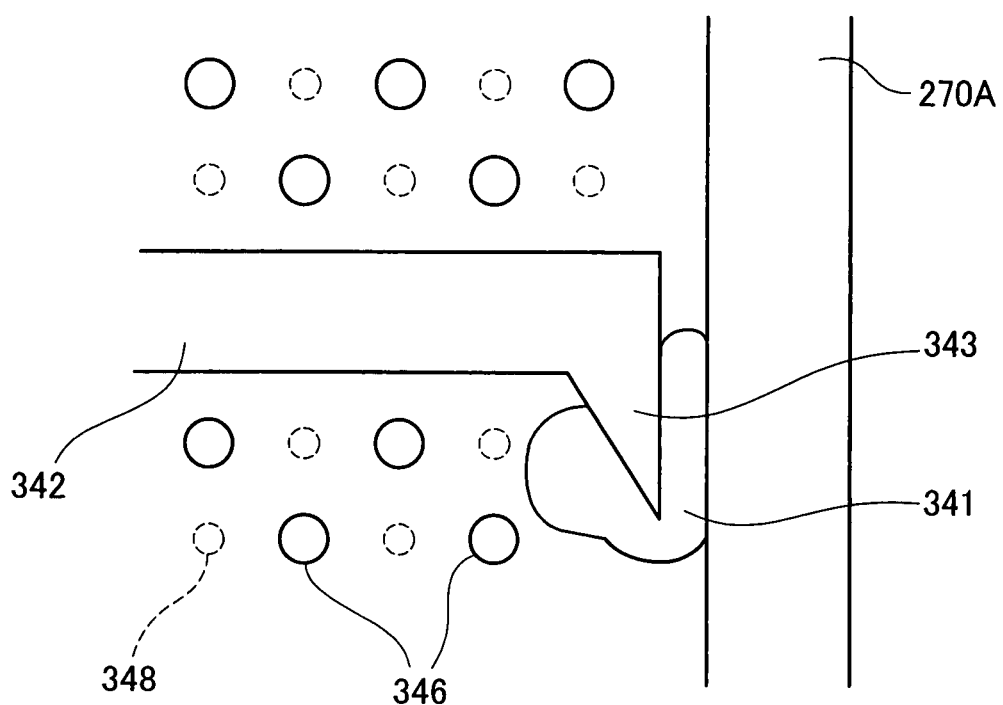
FIG. 16 is an enlarged view showing an area Y encircled by the broken line in FIG. 10(A)

FIG. 16 is an enlarged view showing an area Y encircled by the broken line in FIG. 10(A). In the state of FIG. 16, a gas leakage preventing structure 341 is formed after attachment of the resin frame 270A to the separator 264A.

As shown in FIG. 16, there is a clearance between one end of the parting line convex 342 extended toward the periphery of the power generation region 340 on the separator 264A and the inner circumference of the center hole 330 formed in the resin frame 270A. The parting line convex 342 is formed to be slightly shorter by taking into account the possible manufacturing error, in order to prevent the resin frame 270A from being located on the extended end of the parting line convex 342 in assembly of the fuel cell stack. In the structure of this embodiment, the extended end of the parting line convex 342 has a boot-shaped extension 343 formed along the inner circumference of the center hole 330. In assembly of the fuel cell stack, the gas leakage preventing structure 341 is formed to fill up the clearance between the extended end of the parting line convex 342 and the resin frame 270A. The gas leakage preventing structure 341 is provided by filling the clearance between the extension 343 of the parting line convex 342 and the resin frame 270A with a liquid adhesive. The respective ends of all the parting line convexes 342 of the separator 264A and the parting line convex 362 of the separator 264B extended toward the periphery of the power generation region 340 have extensions of the same boot-like shape. The gas leakage preventing structures are provided in the vicinity of these extended ends.

As described above, in the fuel cell stack of the embodiment, at least one parting line convex is formed and arranged on one face of each separator to connect plural divisional areas in series via at least one joint area. The plural divisional areas are formed by parting a power generation region by the parting line convex. Multiple divisional area linear convexes are formed in the plural divisional areas to be parallel to the parting line convex and to have both ends away from the periphery of the power generation region. Multiple refrigerant flow linear convexes are formed on the other face of the separator as the reverse structure of the first concavo-convex structure including the parting line convexes and the divisional area linear convexes. The multiple refrigerant flow linear convexes are arranged in parallel to the parting line convexes and have both ends away from the periphery of the power generation region. The separator is, for example, a sheet metal plate press-formed to have the mutually reverse structures on its two faces. One face of the sheet metal separator forms a serpentine flow path including plural straight portions for the linear flow of the reactive gas and at least one folded portion for inversion of the flow of the reactive gas. The plural straight portions are connected in series to form the serpentine flow path as a whole. The other face of the sheet metal separator forms a refrigerant flow path for the straight flow of the refrigerant in parallel to the straight flow of the reactive gas through the straight portions of the serpentine flow path. This arrangement simultaneously forms the flow path of the reactive gas having the high flow velocity and the flow path of the refrigerant having the small pressure loss as the mutually reverse structures on the two faces of the separator.

Like the separator 264B shown in FIG. 11(A), formation of one parting line convex parts the power generation region into two divisional areas and attains serial connection of the two divisional areas via one joint area including the first space between the other end of the parting line convex and the periphery of the power generation region. Like the separator 264A shown in FIG. 10(A), formation of plural parting line convexes parts the power generation region into plural divisional areas and attains serial connection of the plural divisional areas via plural joint areas. For this purpose, multiple divisional area linear convexes are formed in the respective divisional areas to be parallel to one another and to have their longitudinal axes in the horizontal direction. The multiple divisional area linear convexes are arranged in succession in the vertical direction with alternately changing the direction of their extended ends toward the periphery of the power generation region.

In each unit fuel cell of the fifth embodiment, the divisional area linear convexes are formed with specific regularity in the respective divisional areas and are arranged in the first concavo-convex structure to overlap phantom divisional area linear convexes, which are to be formed at regular intervals without any parting line convexes. Even when the anode-side separator and the cathode-side separator have different configurations of parting line convexes (different numbers and/or different positions of the parting line convexes), such arrangement of the divisional area linear convexes at the corresponding positions on the two separators enables the divisional area linear convexes formed on the respective separators to be in contact with each other in an overlapping manner across the electrolyte assembly. Refrigerant flow linear convexes are formed and arranged similarly as the reverse structure of the first concavo-convex structure on the refrigerant flow path-forming face of each separator. The refrigerant flow linear convexes formed on the separators in adjacent unit fuel cells are thus in contact with each other in an overlapping manner. The overlapped contact of the divisional area linear convexes across the electrolyte assembly and the overlapped contact of the refrigerant flow linear convexes desirably reduce the contact resistance in the fuel cell stack (enhances the power collection property) and ensure the strength against an external force applied in the laminating direction of the fuel cell stack. This enhances the overall rigidity of the whole fuel cell stack. The overlapped contact of the refrigerant flow linear convexes increases the flow passage sectional area of the inter-unit cell refrigerant flow path defined by each pair of adjacent separators. This decreases the pressure loss in the inter-unit cell refrigerant flow path and reduces the energy consumption by auxiliary machinery including a pump for feeding the refrigerant into the inter-unit cell refrigerant flow path.

In the structure of the fifth embodiment, each parting line convex formed on the gas flow path-forming face of one separator overlaps two divisional area linear convexes formed on the gas flow path-forming face of the opposed separator across the electrolyte assembly. Even when the anode-side separator and the cathode-side separator have parting line convexes at different positions, the mutual support between the parting line convexes and the opposed divisional area linear convexes across the electrolyte assembly ensures the enhanced power collection property, the high strength, and the sufficient rigidity of the fuel cell stack. The parting line convexes have the greater width than the width of the divisional area linear convexes. The wider parting line convex effectively prevents leakage of the gas flow between divisional areas parted by the parting line convex. This arrangement does not cause a partial decrease in gas flow rate in the inner-unit cell gas flow path due to the gas leakage and keeps the substantially uniform gas flow rate in the respective inner-unit cell gas flow paths over the whole power generation region, thus ensuring the sufficient power generation performance.

The width of the wider parting line convex formed on each separator may not be equal to the total width of two divisional area linear convexes formed on the opposed separator. The supporting effect by the convexes formed on the opposed faces is attainable by the parting line convexes having any width that covers over at least one divisional area linear convex. The width W5 of the top of the parting line convex formed on one face may cover over the tops of 'n' divisional area linear convexes formed on the opposed face. This is expressed by Equation (2) given below:

$$W5 = W1 \times n + W2 \times (n-1) \qquad (2)$$

where W1 represents the width of the top of each divisional area linear convex, and W2 represents the pitch of the divisional area linear convexes.

The width of each parting line convex may be greater than the total width of a preset number of opposed divisional area linear convexes. The greater width of the parting line convexes has the higher effect of preventing leakage of the gas flow between adjoining divisional areas.

With a view to preventing the potential gas leakage between the divisional areas, the height of each parting line convex in the laminating direction of the fuel cell stack (that is, the height in the direction of the thickness of each separator) may be greater than the heights of the other convexes (the multiple divisional area linear convexes and the large number of projections in the structure of the fifth embodiment) that are included in the first concavo-convex structure and are in contact with the electrolyte assembly 250. This arrangement increases the contact pressure of the parting line convexes against the electrolyte assembly 250, thus enhancing the effect of preventing the potential gas leakage.

In the structure of the fifth embodiment, all the parting line convexes, the divisional area linear convexes, and the refrigerant flow linear convexes have flat tops of preset widths. The flat tops of the convexes ensure the sufficient contact area against the respective adjoining elements. The flat tops of these convexes are, however, not essential. Formation of the respective convexes with no flat tops in specific regularity and lamination of the separators to attain the mutual overlap of the parting line convexes with the divisional area linear convexes across the electrolyte assembly in each unit fuel cell and to attain the direct contact of the refrigerant flow linear convexes in adjacent unit fuel cells still attain some advantageous effects on the power collection property, the strength, and the rigidity.

In the fuel cell stack of this embodiment, the projections formed in the joint areas and the flow in-out areas on the respective gas flow path-forming faces of the anode-side separator and the cathode-side separator are in contact with each other in an overlapping manner across the electrolyte assembly. The projections formed in the rear-face areas (corresponding to the joint areas and the flow-in areas) on the respective refrigerant flow path-forming faces of the anode-side separator and the cathode-side separator in adjacent unit fuel cells are in direct contact with each other in an overlapping manner. This arrangement also enhances the power collection property, the strength, and the rigidity of the fuel cell stack. The projections formed in the joint areas, the flow-in out areas, and the corresponding rear-face areas desirably stir the flow of the reactive gas and the flow of the refrigerant, prior to flowing into the gas flow path of the divisional areas and flowing into the refrigerant flow path defined by the refrigerant flow linear convexes. This arrangement improves the flow distribution of the reactive gas into the respective inner-unit cell gas flow paths (that is, the uniformity of distribution of the gas flow over the whole gas flow path) as well as the flow distribution of the refrigerant into the respective inter-unit cell refrigerant flow paths, thus attaining the better cell performance. The mutual contact of the projections formed on the opposed refrigerant flow path-forming faces of the adjacent separators increases the flow passage sectional area of each inter-unit cell refrigerant flow path. This decreases the pressure loss in the inter-unit cell refrigerant flow path and reduces the energy consumption by auxiliary machinery including a pump for feeding the refrigerant into the inter-unit cell refrigerant flow path.

In the structure of the fifth embodiment, three parting line convexes formed the anode-side separator 264A divides the power generation region into four divisional areas. One parting line convex formed on the cathode-side separator 264B divides the power generation region into two divisional areas. The numbers of the parting line convexes (that is, the numbers of the divisions of the power generation region) are, however, not restricted to these values but may be set arbitrarily.

In the structure of this embodiment, the holes for formation of the reactive gas supply manifold and the reactive gas exhaust manifold in lamination of the unit fuel cells are provided along the sides perpendicular to the longitudinal axis of the parting line convexes (along the sides 300 and 305 in the vertical direction). This arrangement desirably reduces the size of the fuel cell stack in the direction of the perpendicular sides. It is desirable to form even numbers of the parting line convexes or odd numbers of the parting line convexes in the respective first concavo-convex structures of both the anode-side separator and the cathode-side separator. This enables the identical positional relation of the gas supply manifold and the gas exhaust manifold formed on the same side or formed on the opposed sides with regard to both the fuel gas flow and the oxidizing gas flow, thus attaining the efficient layout of the respective gas manifolds.

In the structure of this embodiment, the anode-side separator 264A has a greater number of parting line convexes and accordingly a greater number of divisional areas than the cathode-side separator 264B. When hydrogen gas of high purity and the air are respectively used as the fuel gas and the oxidizing gas, the required flow rate of the fuel gas to be supplied to the fuel cell stack is lower than the required flow rate of the oxidizing gas. Hydrogen has the significantly smaller molecular weight than that of oxygen, so that the oxidizing gas generally has the higher flow rate. The greater number of divisional areas on the anode side decreases the flow passage sectional area of the flow path and accordingly increases the flow velocity of the fuel gas in the inner-unit cell fuel gas flow path. The high flow velocity of the fuel gas increases the gas utilization rate and enhances the performance of the fuel cells, while improving the drainage from the inner-unit cell fuel gas flow path.

In the structure of the fifth embodiment, the fuel gas is flowed downward in the vertical direction on the face of the separator, whereas the oxidizing gas is flowed upward in the vertical direction on the face of the separator. The fuel gas and the oxidizing gas accordingly flow in the opposed directions. Especially in polymer electrolyte fuel cells, the opposed gas flows keep the gas humidities at a certain level without additional humidification. The gas flow generally has the greater water content in the downstream in the inner-unit cell gas flow path. Since water is produced on the cathode side in the power generation process, this tendency is prominent on the cathode side. In the polymer electrolyte fuel cells, water is transmitted through the solid polymer electrolyte membrane according to the difference in water vapor pressure between the respective sides of the solid polymer electrolyte membrane. Formation of the opposed gas flows causes the downstream of the oxidizing gas flow path and the upstream of the fuel gas flow path having a large water vapor pressure difference to be located adjacent to each other across the electrolyte membrane. This enables transmission of the water content from the downstream of the oxidizing gas flow path to the upstream of the fuel gas flow path. The upward flow of the oxidizing gas having the higher flow velocity and the downward flow of the fuel gas having the lower flow velocity in the vertical direction take advantage of the gravity and improve the drainage even in the fuel gas flow path having the lower gas flow velocity.

In this embodiment, the first concavo-convex structure formed as the reverse of the second concavo-convex structure has both the parting line convexes and the divisional area linear convexes. In one possible modification, the parting line convexes may not be included in the first concavo-convex structure but may be formed separately from a conductive base plate having the first concavo-convex structure and the second concavo-convex structure. In this modification, a conductive base plate is prepared to have divisional area linear convexes on one face and refrigerant flow linear convexes on the other face, and at least one parting line convex separately provided is bonded between at least one pair of selected divisional area linear convexes on the base plate. This modified structure also forms a serpentine gas flow path including one or plural folded portions and straight refrigerant flow paths on the respective faces of the base plate and thus exerts the similar effects to those of the fifth embodiment described above. The separately provided parting line convexes are preferably made of an electrically conductive material. This arrangement effectively reduces the internal resistance of the fuel cells and enhances the performance of the fuel cells.

In the fuel cell stack of the fifth embodiment, the gas leakage preventing structure 341 is provided to fill up the clearance between the extended end of each parting line convex 342 and the periphery of the power generation region or the inner circumference of the resin frame. The gas leakage preventing structure 341 effectively prevents the potential leakage of the gas flow between the divisional areas via the clearance. This prevents a partial decrease of the gas flow rate and keeps the sufficient gas flow rate over the whole inner-unit cell gas flow path. The extended end of the parting line convex 342 has the boot-shaped extension 343 formed along the periphery of the power generation region. The extension 343 increases the pressure loss in the clearance and, in combination with the gas leakage preventing structure of the adhesive, enhances the effect of preventing the potential gas leakage via the clearance.

The joint areas on the gas flow path-forming face of the separator have projections and concaves arranged at regular intervals as the reverse structure of the concaves and projections of the refrigerant flow path forming-face. A portion of the joint area in the neighborhood of the extension 343 of each parting line convex 342 has no such projection or concave to facilitate filling of the adhesive. The extension 343 of the parting line convex 342 occupies only a small patch of the joint area and does not significantly decrease the effective area of the reactive gas flow for power generation.

In the fuel cell stack of the fifth embodiment, the gas leakage preventing structure is made of the adhesive. The gas leakage preventing structure is, however, not restricted to the adhesive but may be made of another suitable material. FIG. 17 shows a modified example including another gas leakage preventing structure. In this modified example, a gas leakage preventing structure 341A of a certain shape having substantially the same thickness as that of the resin frame is made of an elastic material, such as rubber or resin and is provided separately from the resin frame. The resin frame has cuts 341B for receiving the gas leakage preventing structures 341A fitted therein at the positions to be close to the extended ends of the respective parting line convexes 342 in lamination. FIG. 17(B) shows the resin frame 270A with the cuts 341B. FIG. 17(A) shows the resin frame 270A with the gas leakage preventing structure 341A fitted in the cut 341B, which is laid on the gas flow path-forming face of the separator 264A. The gas leakage preventing structure 341A may be made of an electrically conductive material or an insulating material. The gas leakage preventing structure 341A may be set in the resin frame after attachment of the resin frame to the separator or before attachment of the resin frame to the separator.

The positions of the cuts formed in the resin frame for receiving the gas leakage preventing structures fitted therein are expected to have application of the adhesive for ensuring the gas sealing property and bonding the resin frame to the separator. In assembly of the fuel cell stack, application of the adhesive on the periphery of the power generation region of the separator attains fixation of the gas leakage preventing structure simultaneously with attachment of the resin frame to the separator. Unlike the gas leakage preventing structure made of the adhesive shown in FIG. 16, the gas leakage preventing structure provided as a separate element from the resin frame does not adhere to the electrolyte assembly, which is laid upon the resin frame located on the separator. Even when the solid polymer electrolyte membrane of the electrolyte assembly is expanded in operation, there is no undesirable stress applied on the electrolyte membrane due to the adhering gas leakage preventing structure.

The gas separator of the embodiment may be applied to fuel cells of another configuration that does not include resin frames but uses gaskets or an adhesive as sealing elements for ensuring the gas sealing property. The gas leakage preventing structure of the embodiment may also be provided in the fuel cells of this modified configuration without resin frames. In this modified configuration, the sealing elements are provided on at least part of the peripheral of the power generation region between the electrolyte assembly and the separator to ensure the gas sealing property in the reactive gas flow path. The gas leakage preventing structure may be formed to fill up the clearance between one end of each parting line convex and the sealing element and attain the effect of preventing the potential gas leakage.

Figure 18:
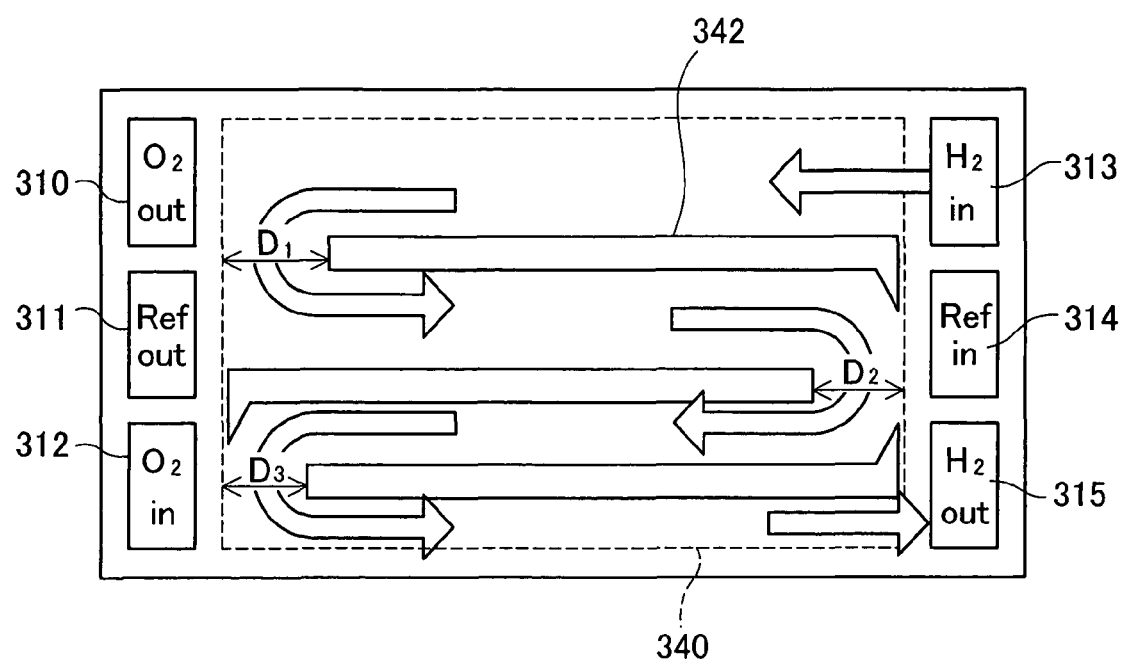
FIG. 18 shows another modified example that gradually narrows the width of divisional areas 380 in the downstream of the gas flow path.

As shown in FIGS. 10 and 11, in the fuel cell stack of the fifth embodiment, the divisional areas 380 formed on the gas flow path-forming face of the separator have practically identical widths. The inner-unit cell gas flow path accordingly has the practically fixed flow passage sectional area from the joint with the gas supply manifold to the joint with the gas exhaust manifold. The width of the divisional areas 380 may alternatively be varied on the gas flow path-forming face of the separator. In the illustrated example of FIG. 18, the width of the divisional areas 380 is gradually narrowed in the downstream of the gas flow path on the anode-side separator. FIG. 18 shows only the parting line convexes 342 as part of the first concavo-convex structure, and the illustration of the divisional area linear convexes and the projections is omitted for the better understanding. Formation of the narrower divisional areas 380 in the downstream of the gas flow path gradually decreases the flow passage sectional area from the upstream to the downstream of the inner-unit cell gas flow path, thus gradually increasing the flow velocity of the reactive gas in the inner-unit cell gas flow path. In the downstream of the reactive gas flow path, the cell reaction consumes the greater amount of the reactive gas or electrode active material (hydrogen or oxygen) to decrease the flow rate of the reactive gas. The gradually narrowed width of the divisional areas 380 increases the flow velocity of the reactive gas in the downstream and ensures the sufficient cell performance. The reactive gas has the greater water content in the downstream of the gas flow path. The increased flow velocity of the reactive gas in the downstream improves drainage in the downstream and thus prevents potential deterioration of the cell performance due to accumulation of water. In the structure with the divisional areas having the narrower width in the downstream, the parting line convexes 342 arranged in the downstream (on the lower side in the vertical direction in the structure of the embodiment) may have the shorter distance between the other end and the periphery of the power generation region. Namely the distances may have the relation of D1>D2>D3 as shown in FIG. 18. This arrangement further enhances the effect of increasing the flow velocity in the downstream over the whole inner-unit cell gas flow path.

In the separator of the fifth embodiment, each divisional area has multiple divisional area linear convexes. The divisional area linear convexes may, however, be replaced by convexes of any other suitable shape that allows the gas flow in the divisional area in parallel to the parting line convex. As one possible modification, each divisional area linear convex that is continuously extended from one end to the other end of the divisional area in the longitudinal direction may be replaced by plural discrete short convexes. These discrete short convexes are arranged along the line of the divisional area linear convex and are equivalent to the shape of the divisional area linear convex with several omissions. One example of this modified structure is shown in FIG. 19(A). As another possible modification, each divisional area linear convex may be replaced by a large number of projections, which are similar to the projections 346 and 366 and are arranged along the line of the divisional area linear convex. One example of this modified structure is shown in FIG. 19(B). The gas flow path-forming face of the separator may have these convexes arranged in parallel to the parting line convex, away from the periphery of the power generation region, and along on the line of each divisional area linear convex. The refrigerant flow path-forming face of the separator may have refrigerant flow linear convexes formed at the positions not interfering with the convexes on the gas flow path-forming face and substantially in parallel to the parting line convexes as the reverse shape of the gas flow path-forming face. The convexes formed as part of the first concavo-convex structure and arranged with specific regularity in the power generation regions of the respective gas flow path-forming faces of adjacent separators are in contact with each other across the electrolyte assembly in one unit fuel cell. The convexes formed as part of the second concavo-convex structure in the respective refrigerant flow path-forming faces of adjacent separators are in direct contact with each other in adjacent unit fuel cells. The continuously extended divisional area linear convexes of the fifth embodiment advantageously increase the contact area of the separator with the adjoining element and accordingly reduce the internal resistance of the fuel cell stack. Another advantage of this structure is easy flow of liquid water to the downstream in the inner-unit cell gas flow path to attain the favorable drainage in the gas flow path. Formation of the multiple short convexes replacing each divisional area linear convex as the example of FIG. 19(A) or the example of FIG. 19(B) advantageously enhances the gas diffusion property in the inner-unit cell gas flow path to raise the gas utilization rate.

In the similar manner, the refrigerant flow linear convexes on the refrigerant flow path-forming face may be replaced by convexes of any other suitable shape that allows the flow of the refrigerant in parallel to the parting line convex. For example, the refrigerant flow linear convexes may be replaced by the shorter convexes shown in FIG. 19(A) or by the projections shown in FIG. 19(B).

The projections formed in the joint areas and the flow in-out areas in the fifth embodiment may be omitted from the gas flow path-forming face of the separator, like the first embodiment described previously. The presence of the second space between the end of each divisional area linear convex and the periphery of the power generation region in the flow in-out areas on the gas flow path-forming face enables the reactive gas introduced into the power generation region to be distributed to the gas flow paths defined by the divisional area linear convexes, while enabling the exhaust gas from the respective gas flow paths defined by the divisional area linear convexes to be joined and discharged outside the power generation region. The presence of the second space in the joint areas on the gas flow path-forming face enables the reactive gas flowed through the gas flow paths defined by the divisional area linear convexes to be inverted to the reverse flow direction. Similarly the projections may be omitted from the refrigerant flow path-forming face of the separator.

The fifth embodiment regards the internal manifold-type fuel cell stack, where the respective separators and resin frames have holes for defining the manifolds of supplying and exhausting the reactive gases and the refrigerant. The separator of the invention with the concavo-convex structures is also applicable to an external manifold-type fuel cell stack having supply and exhaust manifolds of the reactive gases and the refrigerant formed outside the stack structure.

F. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

F-1

In the structures of the embodiments, the separator has multiple straight gas flow paths and multiple straight refrigerant flow paths. These gas flow paths and refrigerant flow paths may alternatively be curved. The separator of the invention requires multiple linear gas flow paths formed in parallel to one another and multiple linear refrigerant flow paths that are reverse to the multiple linear gas flow paths.

F-2

In the embodiments described above, the separator having the mutually reverse structures on its two faces may be a press-formed sheet metal plate or a press-formed non-metal plate made of a suitable non-metal material, such as flexible carbon. The mutually reverse structures assure the substantially uniform wall thickness. The separator of this structure may thus be manufactured with good workability by any other technique, as well as by the press-forming technique.

F-3

In the structures of the first through the fifth embodiments, the inter-unit cell refrigerant flow path is formed between each pair of adjacent unit fuel cells. In one possible modification, the inter-unit cell refrigerant flow path may be provided after lamination of every preset number of unit fuel cells. In the latter case, the configuration of the invention is applied to separators having the refrigerant flow path-forming face as the reverse of the gas flow path-forming face in contact with the electrolyte assembly.

The invention claimed is:

1. A fuel cell, comprising:
an electrolyte assembly; and
a separator including:
one face as a gas flow path-forming face with a gas flow path formed thereon, wherein a reactive gas flows through the gas flow path, and
the other face as a refrigerant flow path-forming face with a refrigerant flow path formed thereon, wherein a refrigerant flows through the refrigerant flow path,
wherein a recess-protrusion shape provided on the one face is reverse to a protrusion-recess shape provided on the other face,
wherein the gas flow path-forming face of the separator has multiple linear gas flow paths that are arranged in parallel to one another, and a gas flow path connection structure that divides the multiple linear gas flow paths into plural linear gas flow path groups and connects adjacent linear gas flow path groups in series among the plural linear gas flow path groups,
wherein a gas flow direction between the adjacent linear gas flow path groups is a serpentine pattern,
wherein the refrigerant flow path-forming face has multiple linear refrigerant flow paths that are formed as a reverse structure of the multiple linear gas flow paths on the gas flow path-forming face,
wherein a refrigerant flow path connection structure that is formed as a reverse structure of the gas flow path connection structure on the gas flow path-forming face, the refrigerant flow connection structure communicating with the respective multiple linear refrigerant flow paths,
wherein the gas flow path connection structure has a gas flow path parting beam to divide the multiple linear gas flow paths into the plural linear gas flow path groups,
wherein a width of a top of the gas flow path parting beam (W5) is substantially equal to a sum of a width of a pitch of a gas flow path forming beam (W2) multiplied by a positive integer (n×W2) and a width of a top of the gas flow path forming beam (W1) multiplied by the positive integer incremented by one ((n+1)×W1), in order for the gas flow path parting beam to have a higher contact pressure against the electrolyte assembly than a contact pressure of the gas flow path forming beam, and wherein the gas flow path parting beam is provided to have a greater height than a height of the gas flow path forming beam in a laminating direction of the electrolyte assembly and the separator.

2. The fuel cell of claim 1, wherein the gas flow path connection structure has a concavo-convex shape that is separate from the multiple linear gas flow paths and is in contact with the electrolyte assembly.

3. The fuel cell of claim 1, wherein the gas flow path connection structure connects all the plural linear gas flow path groups in series.

4. The fuel cell of claim 1, wherein the refrigerant flow path-forming face of the separator has a specific linear refrigerant flow path formed as the reverse of the gas flow path parting beam, and the refrigerant flow path connection structure has a flow rate control element that is designed to restrict a flow rate of the refrigerant flowed into the specific linear refrigerant flow path to be close to a flow rate of the refrigerant flowed into the multiple linear refrigerant flow paths.

5. The fuel cell of claim 4, wherein the flow rate control element of the refrigerant flow path connection structure has a weir formed outside the specific linear refrigerant flow path to restrict the flow rate of the refrigerant flowed into the specific linear refrigerant flow path.

6. The fuel cell of claim 1, wherein the refrigerant flow path-forming face of the separator has a specific linear refrigerant flow path formed as the reverse of the gas flow path parting beam, and the specific linear refrigerant flow path is designed to restrict a flow rate of the refrigerant flowed into the specific linear refrigerant flow path to be close to a flow rate of the refrigerant flowed into the multiple linear refrigerant flow paths.

7. The fuel cell of claim 6, wherein the separator has a flow rate control member that is attached to an inside wall of the specific linear refrigerant flow path to restrict the flow rate of the refrigerant flowed into the specific linear refrigerant flow path.

8. The fuel cell of claim 1, wherein the gas flow path connection structure has a rectifier element to approximately equalize a flow velocity of the reactive gas flowed into the multiple linear gas flow paths.

9. The fuel cell of claim 1, wherein the separator is made of a metal.

10. The fuel cell of claim 9, wherein the separator is a press-formed sheet metal plate.

11. The fuel cell of claim 1, wherein the refrigerant flow path connects the multiple linear refrigerant flow paths in parallel without partition.

12. The fuel cell of claim 1, wherein the beam is formed on the side of the gas flow path only and a corresponding recessed surface is formed on the side of the refrigerant flow path.

* * * * *

UNITED STATES PATENT AND TRADEMARK OFFICE
CERTIFICATE OF CORRECTION

| | |
|---|---|
| PATENT NO. | : 8,557,448 B2 |
| APPLICATION NO. | : 11/667876 |
| DATED | : October 15, 2013 |
| INVENTOR(S) | : Y. Yamamoto et al. |

It is certified that error appears in the above-identified patent and that said Letters Patent is hereby corrected as shown below:

In the Specification

At Column 1, line 4, please insert the following paragraph (after the Title):

-- This is a 371 national phase application of PCT/JP2006/300679 filed 12 January 2006, which claims priority of Japanese Patent Application No. 2005-006290 filed 13 January 2005, the contents of which are incorporated herein by reference. --

Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,557,448 B2                                               Page 1 of 1
APPLICATION NO.  : 11/667876
DATED            : October 15, 2013
INVENTOR(S)      : Yamamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Fifteenth Day of September, 2015

Michelle K. Lee
*Director of the United States Patent and Trademark Office*